US011416476B2

(12) United States Patent
Thummala Abbigari et al.

(10) Patent No.: US 11,416,476 B2
(45) Date of Patent: Aug. 16, 2022

(54) EVENT ORDERING BASED ON AN IDENTIFIER FOR A TRANSACTION

(71) Applicant: salesforce.com, inc., San Francisco, CA (US)

(72) Inventors: Sivananda Reddy Thummala Abbigari, Castro Valley, CA (US); Lawrence Eugenio McAlpin, Bloomington, IN (US); Vikram Kommaraju, Dublin, CA (US); Pulkit Mehta, Fremont, CA (US); Alexey Syomichev, Westport, CT (US); Soumen Bandyopadhyay, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 152 days.

(21) Appl. No.: 16/671,162

(22) Filed: Oct. 31, 2019

(65) Prior Publication Data
US 2021/0133181 A1 May 6, 2021

(51) Int. Cl.
*G06F 16/23* (2019.01)
*G06F 16/25* (2019.01)

(52) U.S. Cl.
CPC ........ *G06F 16/2379* (2019.01); *G06F 16/252* (2019.01)

(58) Field of Classification Search
CPC .................... G06F 16/252; G06F 16/2379
See application file for complete search history.

(56) References Cited

U.S. PATENT DOCUMENTS

| 5,485,608 A * | 1/1996 | Lomet ................. G06F 11/1471 |
| 7,730,478 B2 | 6/2010 | Weissman |
| 9,417,840 B2 | 8/2016 | Pradeep et al. |

(Continued)

FOREIGN PATENT DOCUMENTS

| EP | 3229151 A1 | 10/2017 |
| WO | 2018/097975 A1 | 5/2018 |

OTHER PUBLICATIONS

Vanlightly, A Dive into Multi-Topic Subscriptions with Apache Kafka Sep. 11, 2019, cloudkarafka, https://www.cloudkarafka.com/blog/a-dive-into-multi-topic-subscriptions-with-apache-kafka.html.*

(Continued)

*Primary Examiner* — Jay A Morrison
(74) *Attorney, Agent, or Firm* — Nicholson, De Vos, Webster & Elliott, LLP

(57) ABSTRACT

Implementations store an event associated with a topic in a database to allow for the event to be transmitted in order with respect to other events associated with the topic which are stored in the database. A commit of a transaction is performed that includes inserting the event's payload in a record in a database object. After the commit, a field for the record is updated with an identifier of the commit. The identifier and identifiers of other commits of other transactions on the database indicate ordering of the commit with respect to the other commits. Another field of another record is updated based on the identifier and a last stored value such that the payloads of the event and of the other events are retrievable to be transmitted in an order based on the value of the other field and values of other fields of other records.

20 Claims, 10 Drawing Sheets

(56) References Cited

U.S. PATENT DOCUMENTS

| | | |
|---|---|---|
| 9,767,022 B2 | 9/2017 | Pradeep |
| 10,178,156 B2 | 1/2019 | Pradeep et al. |
| 10,275,281 B2 | 4/2019 | Pradeep et al. |
| 10,298,582 B2 | 5/2019 | Syomichev et al. |
| 10,332,129 B2 | 6/2019 | Torman et al. |
| 10,339,126 B2 | 7/2019 | Pradeep et al. |
| 10,536,463 B2 | 1/2020 | Syomichev et al. |
| 10,592,474 B2 | 3/2020 | Torman et al. |
| 2015/0127670 A1 | 5/2015 | Torman et al. |
| 2016/0077798 A1 | 3/2016 | Pradeep |
| 2016/0080461 A1 | 3/2016 | Pradeep et al. |
| 2017/0060741 A1 | 3/2017 | Pradeep et al. |
| 2017/0075922 A1 | 3/2017 | Torman |
| 2017/0293632 A1 | 10/2017 | Pradeep et al. |
| 2018/0025113 A1 | 1/2018 | Torman et al. |
| 2019/0238653 A1 | 8/2019 | Syomichev et al. |
| 2020/0027126 A1 | 1/2020 | Zhao et al. |
| 2020/0097373 A1 | 3/2020 | Zhao et al. |
| 2020/0099752 A1 | 3/2020 | Naidu et al. |
| 2020/0174854 A1 | 6/2020 | Warshavsky et al. |
| 2020/0218702 A1 | 7/2020 | Fernando et al. |

OTHER PUBLICATIONS

Alexey, How Apache Kafka Inspired Our Platform Events Architecture Feb. 1, 2018, Salesforce Engineering, https://engineering.salesforce.com/how-apache-kafka-inspired-our-platform-events-architecture-2f351fe4cf63?gi=ae6e671dbf2a.*

Marc Juchli et al., Why do .index files exist in the kafka-log directory? May 14, 2015, stackoverflow, https://stackoverflow.com/questions/19394669/why-do-index-files-exist-in-the-kafka-log-directory.*

Screenshot of Supported Versions and Interoperability Sep. 2, 2021, confluent.io, https://docs.confluent.io/platform/current/installation/versions-interoperability.html.*

InsertField date unknown, confluent.io, version 5.3.0, https://docs.confluent.io/5.3.0/connect/transforms/insertfield.html.*

ReplaceField date unknown, confluent.io, version 5.3.0, https://docs.confluent.io/5.3.0/connect/transforms/replacefield.html.*

Kleppmann, Should You Put Several Event Types in the Same Kafka Topic? Jan. 18, 2018, Confluent.io, https://www.confluent.io/blog/put-several-event-types-kafka-topic/.*

Database Concepts, 10 Transactions, 2017, 31 pages, Oracle Database Online Documentation Library, 12c Release 1 (12.1.0.2), Downloaded from https://docs.oracle.eom/database/121/CNCPT/transact.htm#CNCPT016 on Oct. 31, 2019.

PostgreSQL: Documentation 9.5: Transaction Isolation, 2019, 5 pages, Downloaded from https://www.postgresql.org/docs/9.5/transaction-iso.html on Sep. 3, 2019.

* cited by examiner

Fig. 3B

Database 300B

First Database Object 303

| Tenant IDs 290A-S | Payload IDs 325A-S | Payload Fields 109A-S | Topic Fields 112A-S |
|---|---|---|---|
| Org(1) | A |  | t(2) |
| ... | ... | ... | ... |
| Org(1) | O |  | t(4) |
| Org(1) | P |  | t(4) |
| Org(2) | Q |  | t(4) |
| Org(2) | R |  | t(2) |
| Org(1) | S |  | t(4) |

Second Database Object 306

| Tenant IDs 290A-S | Payload IDs 325A-S | Second Fields 124A-S | Topic Fields 112A-S | Times 335A-S |
|---|---|---|---|---|
| Org(1) | A | y | t(2) |  |
| ... | ... | ... | ... | ... |
| Org(1) | O | x-1 | t(4) |  |
| Org(1) | P | x | t(4) |  |
| Org(2) | Q | x+1 | t(4) |  |
| Org(2) | R | y+1 | t(2) |  |
| Org(1) | S | x+2 | t(4) |  |

Third Database Object 309B

| Tenant IDs 290A-S | Payload IDs 325A-S | First Fields 118A-S | Third Fields 121A-S | Times 340A-S |
|---|---|---|---|---|
| Org(1) | A | T(i-2) | R(1) |  |
| ... | ... | ... | ... | ... |
| Org(1) | O | T(i-1) | R(1) |  |
| Org(1) | P | T(i) | R(1) |  |
| Org(2) | Q | T(i+1) | R(1) |  |
| Org(2) | R | T(i+1) | R(2) |  |
| Org(1) | S | T(i+2) | R(1) |  |

Fourth Database Object 312B

| Tenant IDs 390A-T | Last Stored Value 330A-T | Topic Fields 320A-T |
|---|---|---|
| ... | ... | ... |
| Org(1) | y | t(2) |
| Org(2) | y+1 | t(2) |
| ... | ... | ... |
| Org(1) | x+2 | t(4) |
| Org(2) | x+1 | t(4) |
| ... | ... | ... |
| ... | ... | t(N) |

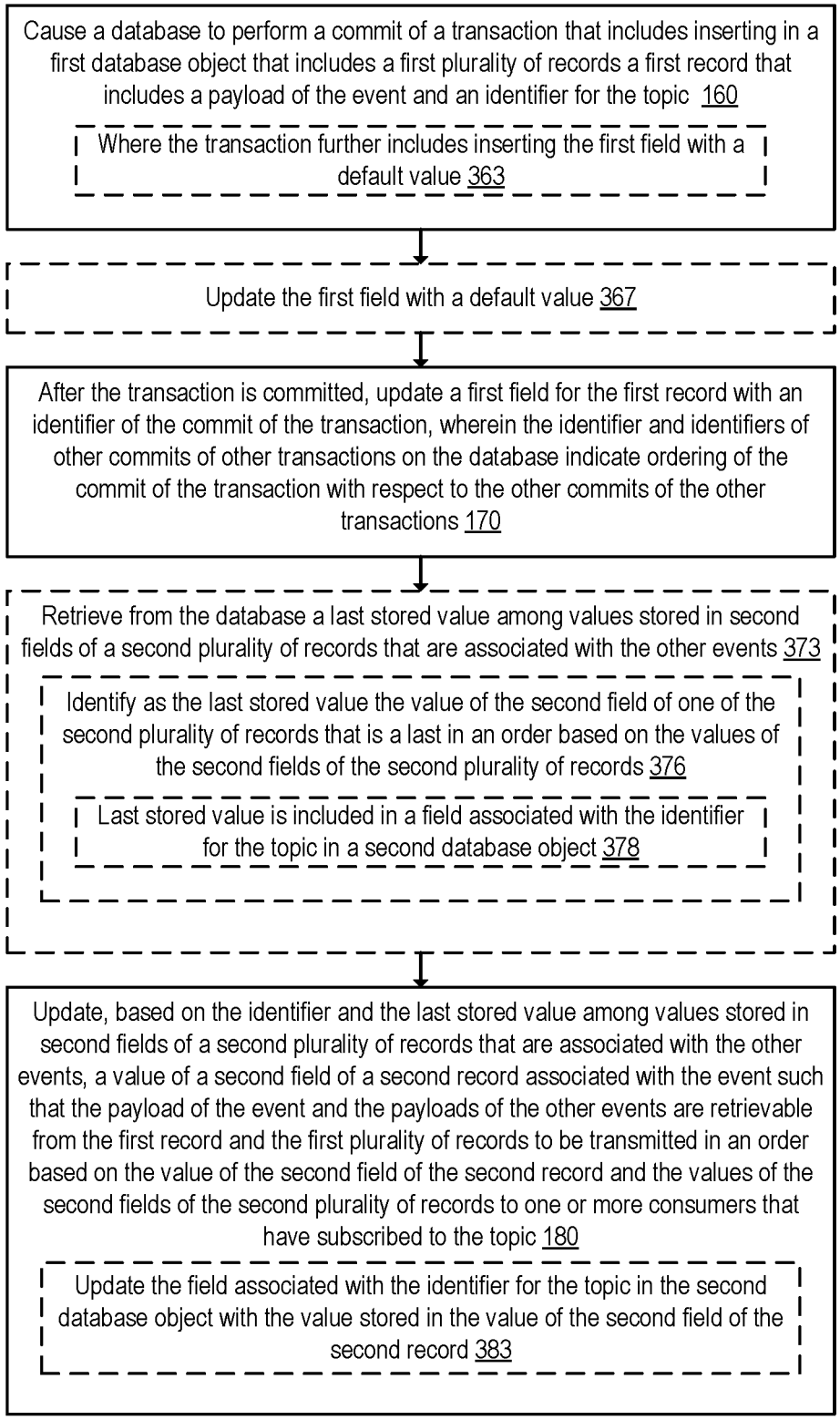

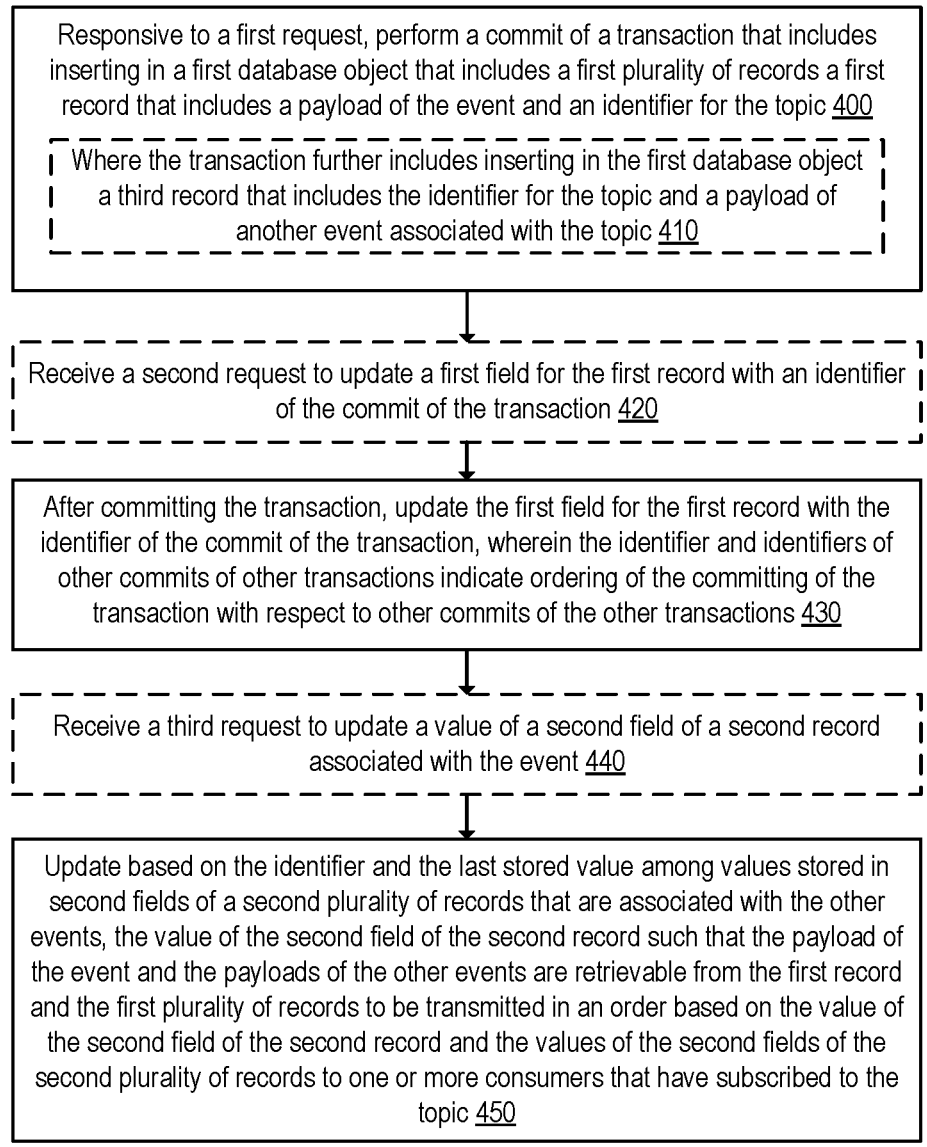

EVENT ORDERING BASED ON AN IDENTIFIER FOR A TRANSACTION

TECHNICAL FIELD

One or more implementations relate to the field of publish-subscribe messaging systems; and more specifically, to storing events in a database.

BACKGROUND ART

A publish-subscribe messaging system allows a publisher of an event (also referred to as a message) to publish the event without knowledge of the consumers subscribed to that topic. An event is any identifiable unit of data that conveys information about an occurrence or lack of occurrence in a computing system, and a topic is a common characteristic of events. For example, an event may convey that a document has been modified and relate to a topic concerning that document. A consumer consumes events (e.g., after subscribing to receive events in a pub-sub system system) and a publisher publishes an event (i.e., causes the event to be made available in a source of data).

Events might be stored in a database or another system of record by the topic to which the events relate. Storing the events in database facilitates their later retrieval from the database and transmission to consumers that have subscribed to the topic. Databases may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store models (also known as document-oriented as they store document-oriented information, which is also known as semi-structured data).

A database may comprise one or more database objects that are managed by a database management system (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) object; 3) an eXtensible Markup Language (XML) document; 4) a key-value pair; etc. A database object can be unstructured or have a structure defined by the DBMS (a standard database object) and/or defined by a user (a custom database object).

Events stored in and retrieved from a database are not inherently ordered. If events are retrieved to be transmitted to consumers and the events are not ordered, the consumers may be unable to consume the events in order, to act on the events in a cohesive manner, and/or to determine whether to retrieve additional events from the database.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3B is another block diagram showing another exemplary database schema for storing an event associated with a topic in a database to allow for the event to be transmitted in order with respect to other events associated with the topic which are stored in the database, according to some example implementations.

FIG. 3C is a more detailed flow diagram showing methods for storing an event associated with a topic in a database to allow for the event to be transmitted in order with respect to other events associated with the topic which are stored in the database, according to some example implementations.

FIG. 4 is a flow diagram showing methods for a database to store an event associated with a topic to allow for the event to be transmitted in order with respect to other events associated with the topic which are stored in the database, according to some example implementations.

DETAILED DESCRIPTION

The following description describes implementations for storing an event associated with a topic in a database to allow for the event to be transmitted in order with respect to other events associated with the topic which are stored in the database. An order is a relation between an item (e.g., a record, an event, etc.) and other items (e.g., other records, other events, etc.). For example, an order of a plurality of numerical values can be ascending, whereby the relation between a value and another value of the plurality is whether the value is greater than the other value.

Typically, an event includes one or more attributes. In some implementations, an event is associated with a topic to which one or more consumers are subscribed. The attributes included in an event can be referred to as a payload (and may or may not include an identifier for a topic and other attributes). An attribute (also referred to as a field) of an event is a part of an event that contains one or more values. For example, an attribute may contain an identifier for a topic. When an event relates to a topic, storing the event in a database includes storing in the database at least 1) the event's payload, and 2) an identifier for the topic (also referred to as a topic ID).

Figure 1A:
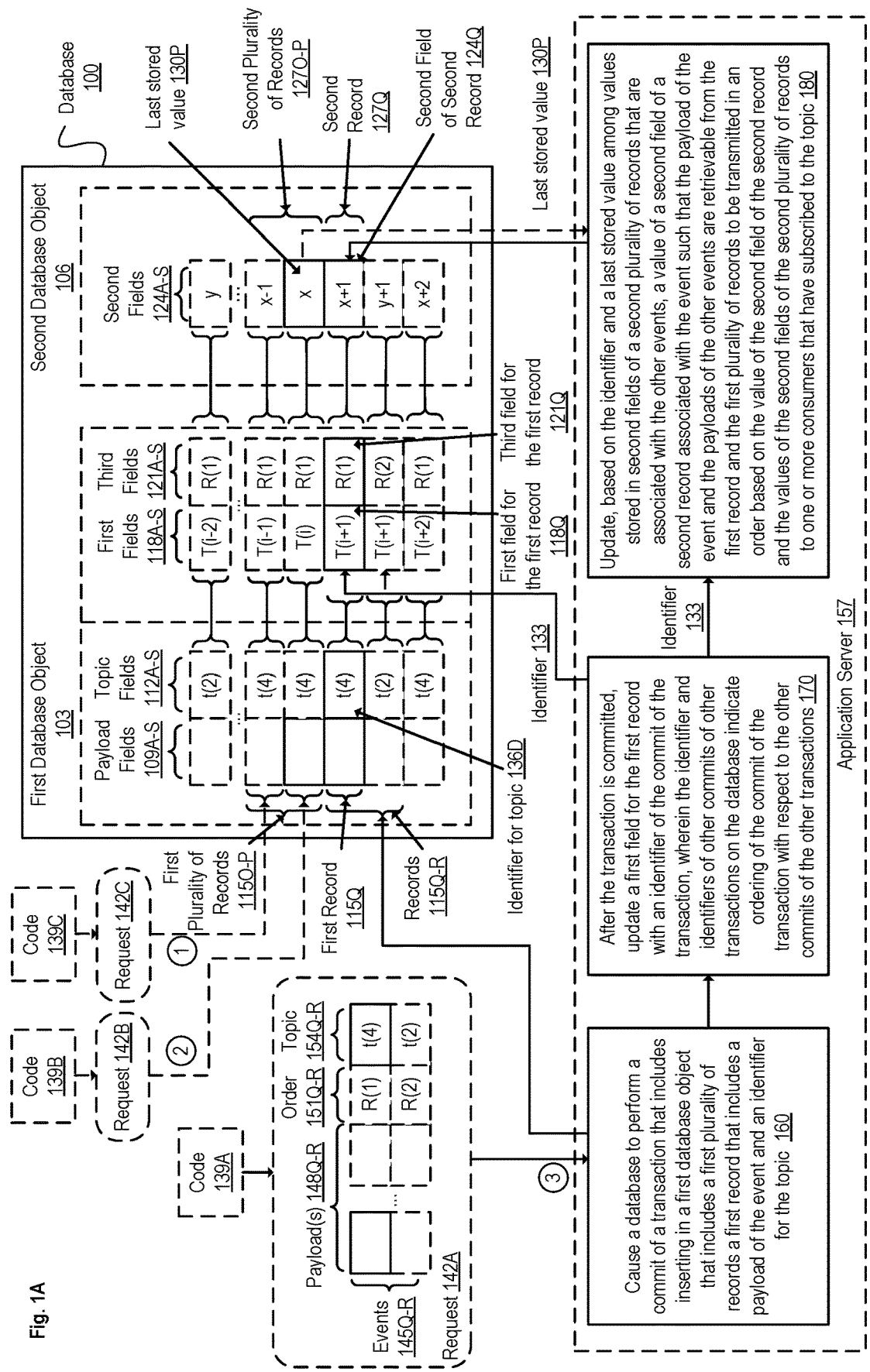
FIG. 1A is a block diagram showing systems for storing an event associated with a topic in a database to allow for the event to be transmitted in order with respect to other events associated with the topic which are stored in the database, according to some example implementations.

FIG. 1A shows database 100 which includes a first database object 103 and a second database object 106. The first database object 103 includes payload fields 109A-S and topic fields 112A-S. Each of payload fields 109A-S is for storing a payload of an event. Each of topic fields 112A are for storing an identifier for a topic to which an event relates. An identifier is data that identifies (e.g., a topic with which an event is associated).

At time 1 (indicated with circular reference "1"), execution of code 139C causes request 142C to be submitted to database 100. Responsive to receiving request 142C, database 100 performs a commit of a transaction that includes inserting a record in the first database object 103. A transaction is a unit of work performed on a database; e.g., a transaction may include one or more insertions, updates, and/or deletions of one or more records in a database. Committing a transaction means completing the unit of work on the database (e.g., when a transaction includes inserting, updating, and/or deleting one more records in a database, committing the transaction includes performing the inserting, updating, and/or deleting the records). A "commit" is an act of committing a transaction. In some implementations, causing the database to perform the commit of the transaction is performed by executing block 160 in an application server (as described later herein). Inserting a record in database 100 may include storing a payload in payload field 109O and a topic ID in topic field 112O. Any payloads included in payload fields 109A-S are not shown in FIG. 1A. In the example shown in the figure, topic field 112O is shown with the value "t(4)" included.

At time 2 (indicated with circular reference "2"), execution of code 139B causes request 142B to be submitted to database 100. Responsive to receiving request 142B, database 100 performs a commit of a transaction that includes inserting another record in the first database object 103. In some implementations, causing the database to perform the commit of the transaction is performed by executing block 160 in an application server (as described later herein). Inserting another record in database 100 may include storing another payload in payload field 109O and another topic ID in topic field 112O (i.e., topic ID "t(4)"). Between time 1 and time 2, and/or between time 2 and time 3, other operations may be performed as discussed referring to implementations later herein.

At time 3 (indicated with circular reference "3"), request 142A is submitted to application server 157. Request 142A includes event 145Q. Event 145Q includes payload 148Q (which may comprise one or more values for one or more attributes) and optionally order 151Q (with value "R(1)") and an attribute for topic ID 154Q (with value "t(4)"). Request 142 optionally includes event 145R. Event 145R includes payload 148R (which may comprise one or more values for one or more attributes) and optionally order 151R (with value "R(2)") and topic ID 154R (with value "t(2)"). Although FIG. 1A shows request 142A as including event 145Q and optionally event 145R, in some embodiments those events are included as data (e.g., as one or more sets of values to be inserted in database 100). Put differently, events 145Q-R need not be included in request 142A in the form of events (e.g., as objects representing events). In other embodiments, events 145Q-R may be included in request 142A in the form of events (e.g., as objects representing events).

Indicating Ordering of Transactions

Responsive to receiving request 142A, application server 157 executes block 160. In block 160, database 100 is caused to perform a commit of a transaction that includes inserting in first database object 103 that includes first plurality of records 115O-P a first record 115Q that includes a payload of the event (in payload field 109Q) and an identifier for the topic 136D (in topic field 112Q).

In some implementations, causing database 100 to commit the transaction can occur by submitting a request and/or causing a request to be submitted to the database. For example, in a database which supports requests expressed in structured query language (SQL), application server 157 can submit or cause to be submitted (e.g., through a programming framework such as Hibernate, Spring, Java Persistence Architecture, etc.) one or more requests including one or more SQL statements (e.g., a statement including "BEGIN TRANSACTION" (to start a transaction); a statement including "INSERT" (to perform an insert); and/or a statement including "COMMIT TRANSACTION" (to commit the transaction)). Other databases may support one or more other query languages (e.g., Procedural Language/Structured Object Query Language (PL/SOQL)). In other implementations, database 100 may be configured such that any operation on the database is performed in a transaction (e.g., the database may be configured with "SET AUTOCOMMIT ON" or similar). In such implementations, causing database 100 to commit the transaction can occur by submitting or causing to be submitted a request to the database (e.g., a statement including the SQL clause "INSERT"). Additionally or alternatively, database 100 may provide an application programming interface (API) for programmatic access. Where database 100 provides such an API, application server 157 can call (or cause to be called) the API to cause the database to perform the commit of a transaction which includes inserting the first record in the first database object (and this call may be in lieu of, or in addition to, one or more requests).

Identifiers of a Commit of a Transaction

From block 160, flow passes to block 170. In block 170, after the transaction is committed, a first field for the first record (i.e., first field 118Q) is updated with an identifier of the commit of the transaction; e.g., identifier 133 (shown in first field 118Q with value "T(i+1)"). The identifier and identifiers of other commits of other transactions on the database (e.g., first field 118P with value "T(i)" and/or first field 118O with value "T(i−1)") indicate ordering of the commit of the transaction with respect to the other commits of the other transactions.

In some implementations, the identifier of the commit of the transaction (also referred to as a commit identifier or commit ID) is generated by database 100. For example, some relational database management systems (RDBMSs) generate a commit ID automatically and might store the identifier such that it can be retrieved by a client of the database (e.g., from a hidden field of or for each record inserted in the transaction such as a hidden field for first record 115Q, hidden fields of or for the first plurality of records 115O-P, etc.). In other databases, a commit ID for a transaction can be obtained or inferred from a transaction log of a database. Other ways of obtaining the commit ID might be possible (e.g., a commit ID might be returned by the database to the application server after the transaction has been committed). Thus, implementations (not shown) might include retrieving the commit ID of a transaction as part of updating the first field for the first record with the commit ID.

The commit ID allows for identifying a commit of a transaction (e.g., in which one or more records were inserted in the database). When records are inserted in different transactions (e.g., first record 115Q inserted in the transaction with commit ID "T(i)" and record 115P with commit ID "T(i−1)"), the commit ID may indicate an order in which the different transactions were committed to the database. In some implementations, this order may reflect a chronological order in which the different transactions were committed. When the order in which different transactions are committed reflects an order (e.g., a chronological order) in which requests are received by the application server, the commit IDs for the different transactions might reflect the order (e.g., the chronological order) in which the requests are received. When the order in which the requests are received also reflects an order (e.g., a chronological order) in which events are published (e.g., in a publish-subscribe messaging system), the commit IDs for the different transactions might reflect the order (e.g., the chronological order) in which the events are published. Publishing an event means making an event available in a source of events (e.g., a datastore, a database, a stream, etc.). Thus, in some implementations, the values stored in the second fields of the second plurality of records correspond to an order (e.g., a chronological order) of publication of those events. Therefore, the commit ID of a transaction is useful to allow for an event associated with a topic to be transmitted (e.g., to one or more consumers) in order with respect to other events associated with the topic which are stored in the database. In implementations which include a database which provides commit IDs for transactions, using those commit IDs provides a reliable source of identifiers for transactions (because the database performing the transactions also provides commit IDs therefor) and may reduce implementation cost (because the database's existing functionality can be used). It should be noted that in some implementations, a commit ID allows for identifying a commit of a transaction regardless of the operation(s) performed in the transaction. For example, a commit ID can identify a transaction involving any manner of operation on a database; e.g., 1) inserting, deleting, and/or updating one or more records in the database; 2) creating, altering, or dropping a database object (e.g., a transaction involving data definition language commands in SQL); and/or 3) granting or revoking access privileges to a database object in a transaction (e.g., a transaction involving data control language statements in SQL), etc.

Identifiers of a Transaction

Implementations are described herein which use a commit ID of a transaction but other implementations in the spirit and scope of the appended claims may update the first field differently. For example, application server 157 could determine an identifier for a transaction based on a counter and an identifier for the preceding transaction (or its commit) Alternatively, application server 157 could determine the identifier based on a time at which a request (such as request 142A) is received or based on an identifier provided in the request (not shown). When the application server determines the identifier for a transaction, block 160 may include updating the first field for the first record with the identifier (and block 170 need not be executed). Committing a transaction which includes updating the first field for a record with an identifier of the transaction means that the identifier can also represent the commit of the transaction. The identifier uniquely represents the commit of the transaction. To ensure that the identifier can uniquely represent the commit of the transaction, some implementations may monitor the transaction to ensure that it is committed and if the transaction is not committed, the identifier may be discarded to ensure identifiers are unique (e.g., if the identifier is based on a counter and an identifier for a preceding transaction). In other implementations, if the transaction is not committed, the identifier may be reused to identify another transaction (e.g., if the identifier is based on a time at which the request is received).

These other ways for updating the first field can provide advantages. For example, these ways allow for an event to be transmitted in order with respect to other events when the database does not provide commit IDs for transactions. These ways can also provide flexibility: code whose execution submits requests (e.g., code 139A) and/or an application server receiving requests (e.g., application server 157) can specify identifiers for transactions (and optionally commit IDs of transactions when the transactions are committed). An order based on such identifiers may or may not represent a chronological order. For example, events may include portions of data in a stream of data and an indication of the order of the data in that stream. Using those indications for identifiers for transactions allows the events (which include portions of data) to be transmitted in order with respect to the order of the data in the stream, regardless of the chronological order in which the events are received in requests to the application server.

In these other embodiments, application server 157 would preferably ensure that the identifiers for transactions are each unique and indicate ordering of the commits of the transactions (a unique identifier is one which identifies a single entity, such as a single transaction). In systems where only one application server receives requests and performs block 160 (which in some alternative implementations may include updating the first field for the first record), the application server can ensure that the identifiers are each unique and indicate the ordering in different ways. For example, the application server can base an identifier of a transaction on 1) an identifier for a last transaction (e.g., by incrementing or decrementing the identifier of the last transaction, or using the output of a different function using the identifier of the last transaction); 2) the output of a function which produces a unique value in a sequence using a seed and a current system time; 3) a current system time; etc. Ensuring that the identifier of a transaction is unique can be achieved using thread-safe programming techniques in some implementations (e.g., by using a mutex or semaphore to access the identifier for the last transaction or the seed for the function, by synchronizing access to an operation which produces the identifier of the transaction, by using a dedicated thread or process for the operation, etc.).

In systems where multiple application servers receive requests and perform block 160 (which in some alternative implementations may include updating the first field for the first record), the applications servers can ensure that identifiers for transactions are unique and indicate this ordering by different ways; e.g., 1) retrieving an identifier of a transaction from a service shared amongst the application servers which ensures that identifiers are unique and in the ordering; 2) retrieving an identifier of a last transaction that was committed and basing an identifier of a transaction on the identifier of the last transaction (e.g., by incrementing or decrementing the identifier of the last transaction, or using the output of a different function using the identifier of the last transaction); etc.

Although implementations which use an identifier of a transaction are within the spirit and scope of the appended claims, implementations are described herein which use a commit ID of a transaction for brevity. Such implementations are exemplary and not limiting. The implementations described herein can alternatively be implementing using an identifier for a transaction (e.g., generated by the application server, included in a request, etc.).

Indicating Ordering

Order can be indicated in different ways. Where a commit ID is a strictly increasing number, an order of two different commit IDs can be indicated by determining when one of the two commit IDs is greater than or less than the other of the two commit IDs. If commit IDs reflects times at which transactions are committed and only one transaction can be committed at a given time, a commit ID of a transaction that is less than another commit ID of another transaction will indicate that the transaction was committed earlier in time than the other transaction was committed (if commit IDs are strictly increasing).

In implementations which use a different approach for identifying the commit of a transaction (e.g., using the output of a function as described above), the order of commits of transactions may be indicated in different ways. For example, when 1) an identifier of a commit of a transaction is an output of a function, and 2) another identifier of another commit of another transaction is another output of that function, the order of the transactions may be determined by a) applying an inverse function to the output, b) applying an inverse function to the other output, and c) comparing the respective outputs from applying the inverse function (e.g., to determine if one of the respective outputs is greater than or less than the other of the respective outputs). Thus, in some implementations, the values of first fields 118A-S may indicate an order without the values themselves being strictly increasing or strictly decreasing.

Indicating Ordering of Events

Using Values of the Second Fields

Returning to FIG. 1A, from block 170, flow passes to block 180. Block 180 includes updating a value of a second field of a second record (i.e., second record 127Q and second field 124Q of that second record) associated with the event (i.e., event 145Q). The value is based on the identifier (i.e., identifier 133) and a last stored value (i.e., last stored value 130P) among values stored in second fields of a second plurality of records (i.e., second plurality of records 127O-P with second fields 124O-P) that are associated with the other events (not shown). As shown in FIG. 1A, second field 124Q of the second record 127Q is updated with the value "x+1" based on identifier 133 and the last stored value 130P of "x." Different implementations may determine the value with which to update the second field of the second record in different ways, as discussed later herein. Some implementations may optionally include inserting the second record in second database object 106 as part of block 180. While implementations are described herein where a second field value is updated based on a first field value and a last stored value, in other implementations, a second field value can be updated based on the first field value without the last stored value. For example, a value of the second field can be updated with the value of the first field. In some implementations, the update of the second field values based on the first field value can be performed when a transaction is committed that includes inserting one or more records for only one event.

In the exemplary implementation shown in FIG. 1A, the value "x+1" for the second field of the second record may be determined by incrementing the last stored value 130P. In some implementations, the last stored value may be an initial value if no last stored value exists. An initial value might be a lowest or a highest value which can be stored in a field of the corresponding datatype depending on the function used for assigning values. For example, if second field values are in an ascending order, the initial value might be a value of −2,147,483,648 if the type of the second field is "int" in some implementations whereas if second field values are in a descending order, the initial value might be a value of 2,147,483,648 if the type of the second field is int in some implementations. In some implementations, the last stored value represents the value of the second field for the last record stored which is associated with the same topic. This value could be the 1) value stored last in time; and/or 2) value stored last in an order (e.g., ascending or descending order, an order relating to the output of a function as previously described, etc.).

The payload of the event 145Q (included in payload field 109Q) and the payloads of the other events (included in payload fields 109O and 109P) are thus retrievable from the first record 115Q and the first plurality of records 115O-P to be transmitted in an order based on the value of the second field of the second record (i.e., the value "x+1") and the values of the second fields of the second plurality of records (i.e., the values "x−1" and "x"). In some implementations, the event payloads can be retrieved to be transmitted to one or more consumers in this order.

Retrieving events (or their payloads) to be transmitted in an order provides several advantages related to transmitting the events in the order. Transmitting events in an order allows consumers who have subscribed to receive the events to process the events in the order, to act on the events in a cohesive manner, and/or to determine whether to retrieve additional events from the database. For example, if events relate to messages sent and/or received by a user in an instant messaging application, the events may be stored in a database so that the user can review the user's message history. Retrieving events to be transmitted in an order allows the instant messaging application to display the messages in the order (e.g., a chronological order). For another example, if events relate to portions of data (e.g., segments of video being streamed), the events may be stored in a database to allow the data to be later retrieved. Retrieving events to be transmitted in an order allows the data to be acted on in a cohesive manner; the order may reflect an order of the portions of data in the stream (which may not reflect the order in which the segments of video are to be played). In such an example, the events may indicate an order of the portion of the data included in the event relative to other portions, and the indications used for identifiers of transactions which are committed (as described previously). To further extend the example, the portions of data (i.e., the payloads of the events) may be transmitted as part of buffering the data (e.g., buffering the video to facilitate its uninterrupted playback). Transmitting the events in order allows a consumer (e.g., a video player) to determine whether to retrieve additional events from the database (e.g., to buffer additional segments of video, based on the segments that the video player has already received).

Returning to FIG. 1A, records stored in first database object 103 and/or second database object 106 need not be stored in an order based on the values of the second fields 124A-S. Records may be stored in that order in some implementations, while in other implementations the records may be stored in a different order. Moreover, records need not be retrieved from the first database object 103 and/or second database object 106 in an order based on the values of the second fields 124A-S. Some databases may support retrieving the records in such an order (e.g., through an SQL statement specifying that records selected from one or both tables are to be returned in such an order, such as using an "ORDER BY" clause which references the second fields for the selected records; through an API call which specifies that the second fields for the records should be used to order them). Other databases may not support retrieving the records in such an order. In either case, a client of the database could retrieve records from the first and/or second database objects and the client order those records based on the second fields 124A-S.

Using Values of the Second and Third Fields

Implementations may support more than one payload of an event being inserted in any given transaction on the database 100. In the example shown in FIG. 1A, request 142A optionally includes event 145R in addition to event 145Q. Events 145Q and 145R are shown in FIG. 1A as relating to topics with IDs "t(4)" and "t(2)" respectively. However, if events 145Q and 145R related to the same topic, the values of the first fields for those records (i.e., both "T(i+1)") would be insufficient to discern an order for the events because the events would share the same commit ID. In such cases, third fields 121A-S can be used to discern an order.

Figure 1B:
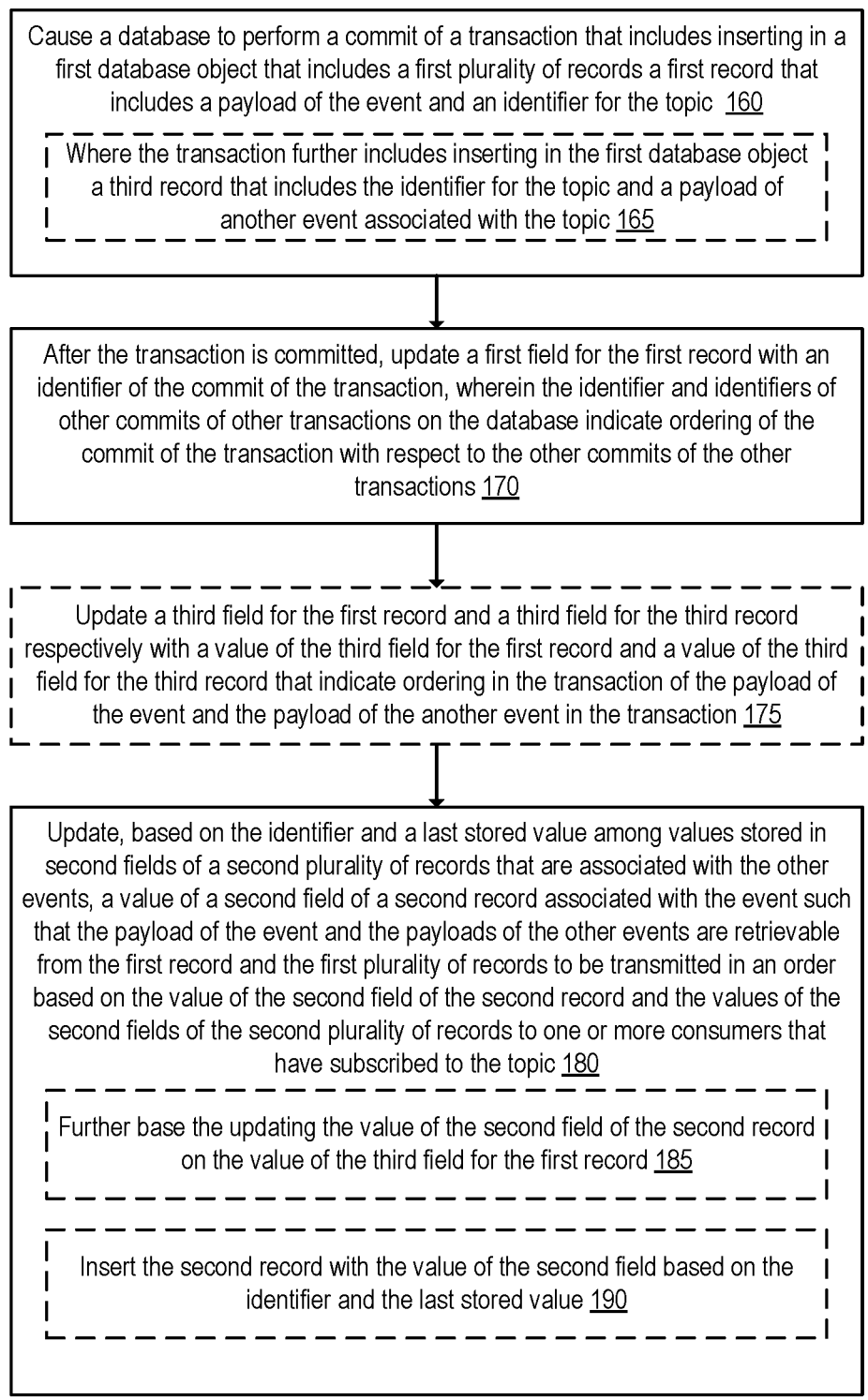
FIG. 1B is a flow diagram showing methods for storing an event associated with a topic in a database to allow for the event to be transmitted in order with respect to other events associated with the topic which are stored in the database, according to some example implementations.

With reference to FIG. 1B, block 160 may optionally include block 165. Block 165 includes inserting in the first database object 103 a third record (not shown) that includes the identifier for the topic (i.e., that the first record 115Q relates to) and a payload of another event associated with the topic. For example, block 165 includes inserting a record 115R where the record includes the identifier for topic 135D (with value "t(4)") rather than the identifier for topic with value "t(2)" as shown in FIG. 1A. From block 160, flow passes to block 170 (already described), and from block 170, flow passes to optional block 175.

In block 175, a third field for the first record (i.e., third field 121Q for the first record) and a third field for the third record (e.g., third field 121R) are updated. The third fields are respectively updated with a value of the third field for the first record and a value of the third field for the third record that indicate ordering in the transaction of the payload of the event (i.e., value "R(1)" from order 151Q) and the payload of the another event in the transaction (i.e., value "R(2)" from order 151R). From block 175, flow passes to block 180.

Block 180 optionally includes block 185. In block 185, updating the value of the second field of the second record (i.e., 124Q) is further based on the value of the third field for the first record (i.e., 121Q). For example, in block 185, updating the second field 124Q of the second record would be based on 1) identifier 133 (i.e., "T(i+1)"); 2) last stored value 130P (i.e., "x"), and 3) the third field for the first record (i.e., "R(1)"). Thus, 124Q could be updated with the value "x+1" as shown. To give another example, rather than event 145R relating to the topic with identifier "t(2)" and including order 151R with value "R(2)" (as is shown in FIG. 1A), consider that 1) event 145R relates to the topic with identifier "t(4)" (not shown in FIG. 1A), and includes order 151R with value "R(1)"; and 2) event 145Q includes order 151Q with value "R(2)." Thus in this example, both events 145Q and 145R relates to the topic with identifier "t(4)" and respectively include order "R(2)" and "R(1)." Thus, third field 121Q for the first record is updated with the value "R(2)" and in block 185, updating the second field 124Q of the second record would be based on 1) identifier 133 (i.e., "T(i+1)"); 2) last stored value 130P (i.e., "x"), and 3) the third field for the first record (i.e., "R(2)"). Thus, 124Q could be updated with the value "x+2" (not shown) because the value of the third field for the first record (i.e., "R(2)") indicates that the event is to be transmitted in an order after event 145R (which includes order "R(1)"). Therefore, third fields 121A-S act as a tiebreaker when the payloads of multiple records that relate to a topic are inserted in one transaction (and thus the first fields for those records include the same value).

FIG. 1A shows request 142A including order 151Q-R for events 145Q-R. In one implementation, each of order 151Q-R represents an attribute in events 145Q-R. In another implementation, order 151Q-R represents an order in which the events 145Q-R (or alternatively, data representing those events) are included in request 142A. This order can be represented explicitly (e.g., request 142A includes data separate from events 145Q-R that indicates their respective ordering) or implicitly (e.g., the order in which events 145Q-R (or data corresponding thereto) are included in request 142A indicate the events' respective ordering).

Further basing the updating a value of a second field on the value of the third field for the first record, such as is performed in block 185, allows for events (or their payloads) to be inserted in bulk in a transaction and nonetheless those events (or their payloads) to be retrieved to be transmitted in a definite order. Moreover, since the value of the third field is updated based on the ordering of an event's payload, basing the updating of the second field on that value provides flexibility for the component (e.g., code 139A) that submits the request. Specifically, the component can specify the ordering of events (or their payloads) in the request, and that ordering will be reflected when the events (or their payloads) are retrieved from the database to be transmitted in an order.

Retrieving Events or Their Payloads

When blocks 160, 170, and 180 have been executed (and optionally in some implementations, when blocks 165, 175, and 185 have also been executed), events (or their payloads) can be retrieved from database 100 to be transmitted in an order based on the values of the second fields 124A-S. In some implementations, the value of the second field of a second record can be considered an identifier of the event. Transmitting an event (e.g., to a consumer) means sending the event such that it is expected to be received (e.g., by the consumer). As discussed, payload fields 109A-S include payloads for events and topic fields 112A-S include identifiers for topics to which the events relate. Retrieving a payload for an event thus includes retrieving one or more values from one of payload fields 109A-S. If an event consists of a payload and an identifier for a topic, retrieving the event includes retrieving values from one of payload fields 109A-S and from a corresponding one of topic fields 112A-S. For example, retrieving event 145Q includes retrieving a value of payload field 109Q and an identifier for topic 136D from topic field 112Q. In some implementations, an event may include additional data to a payload and an identifier for a topic (e.g., in some implementations, an event might include a header that includes data describing the event). In those implementations, the additional data can be stored in 1) a payload field for the event; 2) more than one payload field for the event (not shown), and/or 3) other fields in the first database object 103 or some other database object (not shown). The first case has been discussed. In the second case, retrieving an event further includes retrieving values from the more than one payload field for the event. In the third case, retrieving the event includes retrieving values of the other fields. If attributes for an event are stored in different database objects in database 100, in some implementations the event can be retrieved by performing a join on those different database objects (e.g., based on a field which is common to both database objects; e.g., a field which identifies an event, a field which identifies an event's payload, etc.). Exemplary schemas for database 100 are discussed referring to FIGS. 3A and 3B.

Retrieving events (or their payloads) to be transmitted in an order based on the values of second fields includes retrieving the values of the second fields. For example, retrieving event 145Q in an order based on the second field 124Q of the second record includes: 1) retrieving a value of payload field 109Q and the identifier for topic 136D from topic field 112Q; and 2) retrieving the value of the second field 124Q of the second record (i.e., the value "x+1"). As shown in FIG. 1A, second fields 124A-S are included in the second database object 106 while payload fields 109A-S (and topic fields 112A-S) are included in the first database object 103. In some implementations, retrieving event 145Q in an order based on the second field 124Q of the second record may include performing a join on the first database object 103 and the second database object 106.

Separate First and Second Database Objects

Including the second fields 124A-S in a database object that is different from first database object 103 provides some advantages which are illustrated as follows. After the execution of block 160 causes database 100 to perform a commit of the transaction with identifier 133, the payload of event 145Q is included in payload field 109Q and the topic ID of event 145Q (i.e., identifier for topic 136D) is included in topic field 112Q. However, the first field (118Q) for the first record and the second field (124Q) of the second record are yet to be updated. Thus, if a request is submitted to database 100 to retrieve event 145Q to be transmitted in an order based on the second field 124Q of the second record, that request cannot cause updated values for those fields to be returned.

By storing first record 115Q in the first database object 103, and second record 127Q in the second database object 106, a client of the database can retrieve the first and second records simultaneously by using a join, as discussed. For example, if both the first and second database objects include a common field (e.g., which includes a unique identifier for a payload), then retrieving the first and second records can be performed by joining the first and second database objects on that common field (e.g., the field including a unique identifier for the payload). Performing an inner join on the first and second database objects (using the common field) will only return the first and second fields if the corresponding first and second records are included in the database.

With reference to FIG. 1B, block 180 optionally includes block 190. In block 190, the updating the value of the second field of the second record (e.g., 124Q) includes inserting the second record (e.g., 127Q) with the value of the second field based on the identifier and the last stored value (e.g., value "x+1"). In implementations which include block 180, if a request on database 100 attempts to retrieve the first record 115Q (or one or more fields thereof) and the second field 124Q of second record using an inner join, the request will not result in the first record 115Q (or fields thereof) being returned. Thus, including the second fields 124A-S in a database object different from first database object 103 provides the advantage that events can only be retrieved from database 100 to be transmitted in an order based on the second fields after the records including the second fields have been inserted in the different database object (e.g., if an inner join is used). This prevents a client of the database retrieving events to be transmitted in an order where the order is potentially erroneous (because one or more second fields are yet to be updated and a default value for those fields are returned).

While in some implementations retrieving the first and second records may be performed by joining the first and second database objects on a common field, in other implementations retrieving the first and second records may be performed differently and still provide similar advantages as described above. For example, retrieving the first and second records may include selecting only those first and second records where a second record corresponding to a first record has a value indicating that the second field of the second record has been updated (e.g., the value is non-NULL).

Same First and Second Database Objects

In some implementations (not shown), second fields 124A-S are included in the first database object 103. Such implementations may optionally include 1) in block 160, inserting the first field in the first database object with a default value (e.g., "NULL") for the second field of the first record; or 2) in block 170, updating the second field for the first record with the default value. In these implementations, retrieving an event (or a payload thereof) from the first record to be transmitted in an order based on the second field can still provide a limited order of the event relative to other events when the second field's value is yet to be updated. For example, the default value of the second field may indicate that 1) the event is to be treated as ordered before or after the other events; and/or 2) the order of the event relative to the other events is yet to be determined. In implementations where availability of events (or their payloads) is favored over being able to retrieve the events to be transmitted in an order based on the second fields, these implementations may be advantageous.

First Field in First Database Object or Otherwise

As indicated in FIG. 1A by the vertical dashed line between topic fields 112A-S and first fields 118A-S, in some implementations the first fields 118A-S and optional third fields 121A-S may be included in the first database object 103 (e.g., first record 115Q includes the first field 118Q and optionally the third field 121Q). In other implementations, the first and optional third fields may be included in a database object that is different from the first database object 103 and the second database object 106 (e.g., a third database object (not shown in FIG. 1A)). In these other implementations, the updating a first field for the first record (performed in block 170) might include inserting in the different database object (not shown) a record which includes the first field (and, optionally, a third field) for the first record. Including the first and optional third fields in a different database object helps separate concerns; i.e., the first database object 103 is concerned with storing data for events, whereas the different database object is concerned with storing data used for ordering the events. In contrast, including the first and optional third fields in the first database object 103 denormalizes database 100, which may improve performance when data is retrieved from either or both of the first and third fields, and from either or both of the payload fields and topic fields. Further exemplary database schemas are discussed referring to FIGS. 3A and 3B.

Ordering of Events for Transmission

Ordering Based on Topic

Figure 2A:
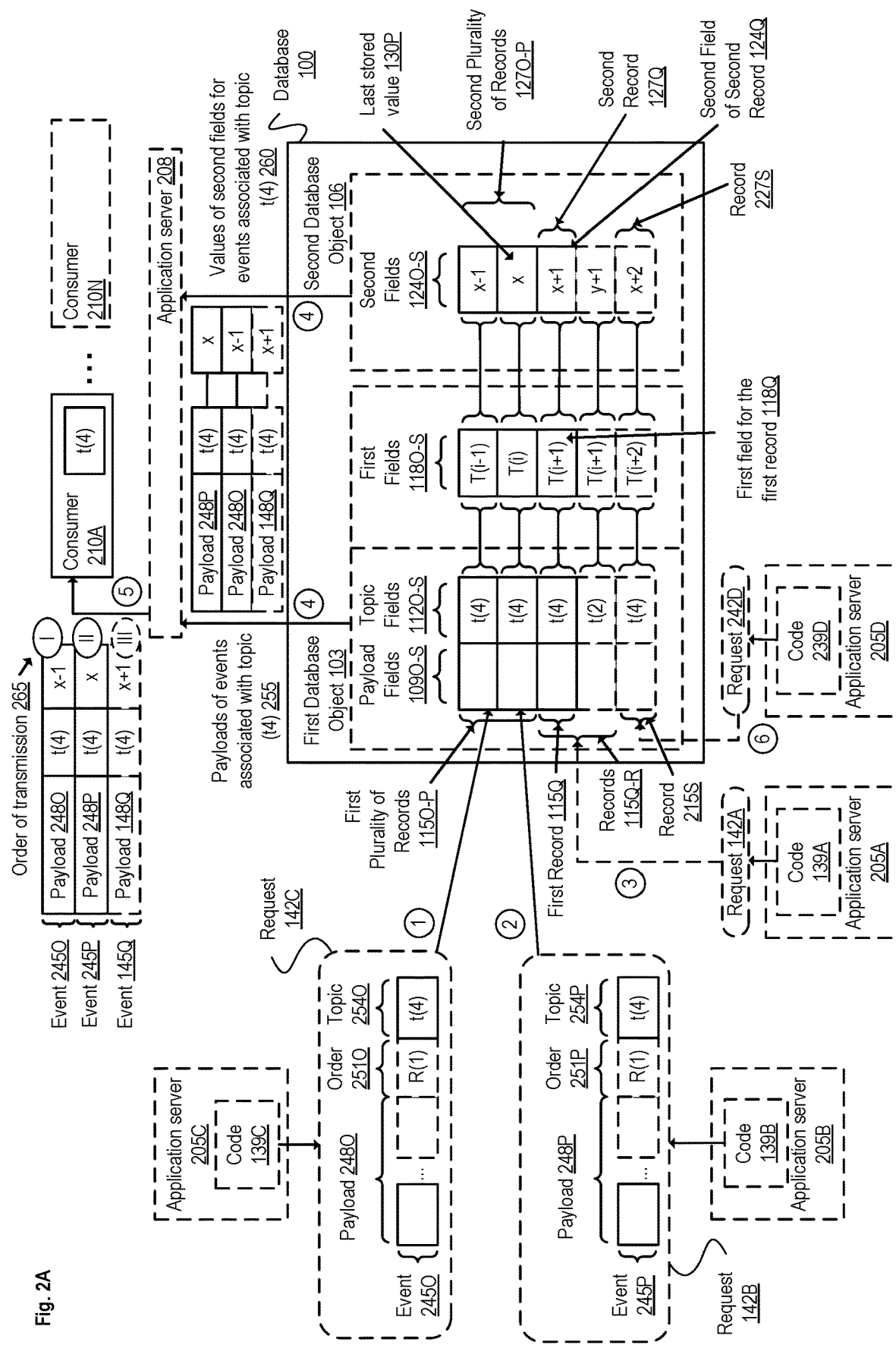
FIG. 2A is a block diagram showing storing events associated with a topic in a database, and retrieval of events from the database, to allow for them to be transmitted in order with respect to other events associated with the topic which are stored in the database, according to some example implementations.

FIG. 2A is a block diagram showing storing events associated with a topic in a database, and retrieval of events from the database to allow for them to be transmitted in order with respect to other events associated with the topic which are stored in the database, according to some example implementations.

Specifically, FIG. 2A shows database 100 which includes a first database object 103 and a second database object 106 which were discussed referring to FIG. 1A. FIG. 2A also shows application server 205C which includes code 139C. Execution of code 139C causes the submission of request 142C (shown in abbreviated form in FIG. 1A) at time 1 (indicated with circled reference "1"). Request 142C includes event 245O (or data therefor). Event 245O includes one or more attributes as payload 248O (which may comprise one or more attributes), an attribute for the identifier for a topic 254O (with value "t(4)"), and optionally order 251O with value "R(1)." Responsive to submission of request 142C: 1) first database object includes a record which includes a payload field 109O and a topic field 112O with value "t(4)"; 2) database 100 includes a first field 118O with value "T(i−1)"; and 3) second database object 106 includes a second field 124O with value "x−1." In some implementations, 1) may be due to execution of block 160 (shown in FIG. 1A); 2) may be due to execution of block 170 (id.); and/or 3) may be due to execution of block 180 (id.). As previously discussed, the first field 118O (and first fields 118O-S) is included in 1) the first database object 103, 2) the second database object 106 (not shown), or 3) another database object (not named), depending on the implementation. Thus, record 115O of the first plurality of records 115O-P and record 127O of the second plurality of records 127O-P are associated with event 245O in some implementations.

FIG. 2A also shows application server 205B which includes code 139B. Execution of code 139B causes the submission of request 142B (shown in abbreviated form in FIG. 1A) at time 2 (indicated with circled reference "2"). Request 142B includes event 245P (or data therefor). Event 245P includes one or more attributes as payload 248P (which may comprise one or more attributes), an attribute for identifier for a topic 254P (with value "t(4)"), and optionally order 251P with value "R(1)." Responsive to submission of request 142B: 1) first database object includes a record which includes a payload field 109P and a topic field 112P with value "t(4)"; 2) database 100 includes a first field 118P with value "T(i)"; and 3) second database object 106 includes a second field 124P with value "x." In some implementations, 1) may be due to execution of block 160 (shown in FIG. 1A); 2) may be due to execution of block 170 (id.); and/or 3) may be due to execution of block 180 (id.). Specifically, executing block 180 in respect to event 245P includes updating second field 124P with value "x" based on the identifier "T(i)" of first field 118P and a last stored value in second fields of a plurality of records associated with other events that are associated with the same topic (i.e., the value "x−1" stored in second field 124O of record 127O which is associated with event 245O, because event 245O is associated with topic ID "t(4)" like event 245P). Thus, in some implementations, record 115P of the first plurality of records 115O-P and record 127P of the second plurality of records 127O-P are associated with event 245P.

FIG. 2A also shows application server 205A which includes code 139A. Execution of code 139A causes the submission of request 142A (shown in abbreviated form in FIG. 1A) at time 3 (indicated with circled reference "3"). The following were discussed referring to FIG. 1A: request 142A, first record 115Q, first field (118Q) for the first record, second record 127Q, and second field 124Q of the second record. In some implementations, first record 115Q and second record 127Q are associated with event 145Q (shown in FIG. 1A).

At time 4 (indicated with circled reference "4"), payloads of events associated with topic (t4) 255 are retrieved from database 100; i.e., from first database object 103. As shown, payload 248P, payload 248O, and payload 148Q are retrieved because they each are associated with topic ID with value "t(4)" (shown in topic fields 112O-Q). A payload is not retrieved from payload field 109S (included in record 215S) because record 215S is inserted after request 242D is submitted at time 6 (indicated with circled reference "6"). Also, values of second fields for events associated with topic t(4) 260 are retrieved from database 100; i.e., from second database object 106. As shown, value "x" is retrieved from second field 124P, value "x−1" is retrieved from second field 124O, and value "x+1" is retrieved from second field 124Q because these second fields are respectively included in record 127P, 127O, and 127Q which are respectively associated with records 115P (including payload 248P), 115O (including payload 248O), and 115Q (including payload 148Q). Note that in some implementations, as mentioned, records 115O-S and/or records 127O-S might not be stored respectively in first database object 103 and second database object 106 in order based on the values of second fields 124O-S. Thus, payloads 248P, 248O, and 148Q may be retrieved in a different order, such as shown in FIG. 2A, by application server 208.

At time 5 (indicated with circled reference "5"), application server 208 transmits events 245O, 245P, and 145Q to consumer 210A that has subscribed to the topic with identifier "t(4)" (as indicated by the box containing the text "t(4)" included in the box for consumer 210A). As shown, event 245O has been reconstituted with payload 248O and topic ID with value "t(4)" both from first database object 103; event 245P has been reconstituted with payload 249P and topic ID with value "t(4)" both from first database object 103; and event 145Q has been reconstituted with payload 148Q and topic ID with value "t(4)" both from first database object 103. Events 245O, 245P, and 145Q are transmitted to consumer 210A in order of transmission 265 indicated with roman numerals I, II, and III, which correspond to the values "x−1," "x," and "x−1" which were the values retrieved respectively from second fields 124O, 124P, and 124Q in second database object 106. In some implementations, the values "x−1," "x," and "x−1" are included with events 245O, 245P, and 145Q. In other implementations, these values are not included with the events (whose ordering may be expressed in the order in which the events are transmitted). Including the values "x−1," "x," and "x−1" (i.e., the values of the second fields) may be useful for the one or more consumers to which the events are transmitted. For example, in some implementations, 1) second field values can be considered identifiers for the events, and 2) a consumer could request events with second field values preceding and/or subsequent to those received (e.g., with second field values greater than or less than those received), such as in the context of requesting a replay of events which are stored in the database.

Thus, implementations are described herein that store an event (e.g., event 145Q) associated with a topic (e.g., topic ID with value "t(4)") in a database (e.g., database 100) to allow for the event to be transmitted in order with respect to other events associated with the topic (events 245O and 245P) which are stored in the database, and the event (or its payload) and the other events (or their payloads) are retrievable to be transmitted in an order based on the value of the second field of the second record (e.g., the value of second field 124Q of second record) and the values of the second fields of the second plurality of records (e.g., the values of second fields 124O and 124P). Additionally, implementations described herein allow for events to be stored in the database from multiple application servers (e.g., application servers 205A, 205B, 205C, and 205D). Thus, the storing of events enables consumers (e.g., consumer 210A) to receive events related to a topic (e.g., topic ID with value "t(4)") in a defined order regardless from where they originate (e.g., regardless whether the events originate from the same application server or from multiple application servers). Such implementations allow for sharing across multiple application servers the role of causing events to be stored, while maintaining coherence in the ordering of the events that are stored by the multiple application servers. This provides numerous advantages, such as scalability and isolation (e.g., having one or more application servers per tenant in a multi-tenant environment, having multiple users per tenant, etc.).

Ordering Based on Topic Regardless of Tenant

As described above, implementations provide for 1) storing events (or their payloads) associated with a topic in a database, and 2) retrieval of events (or their payloads) from the database to allow for them to be transmitted in order with respect to other events associated with the topic which are stored in the database. Other implementations provide these features in a multi-tenant environment, specifically, where events associated with multiple tenants are stored in a database, and those events are retrievable in order with respect to topic and tenant. Advantages of multi-tenant databases are well-known (e.g., maximizing resource usage, reducing operating costs, etc.). Implementations which provide event ordering based on an identifier for a transaction in a multi-tenant environment provide the additional advantages already mentioned in respect to single-tenant environments but in the multi-tenant environment.

Figure 2B:
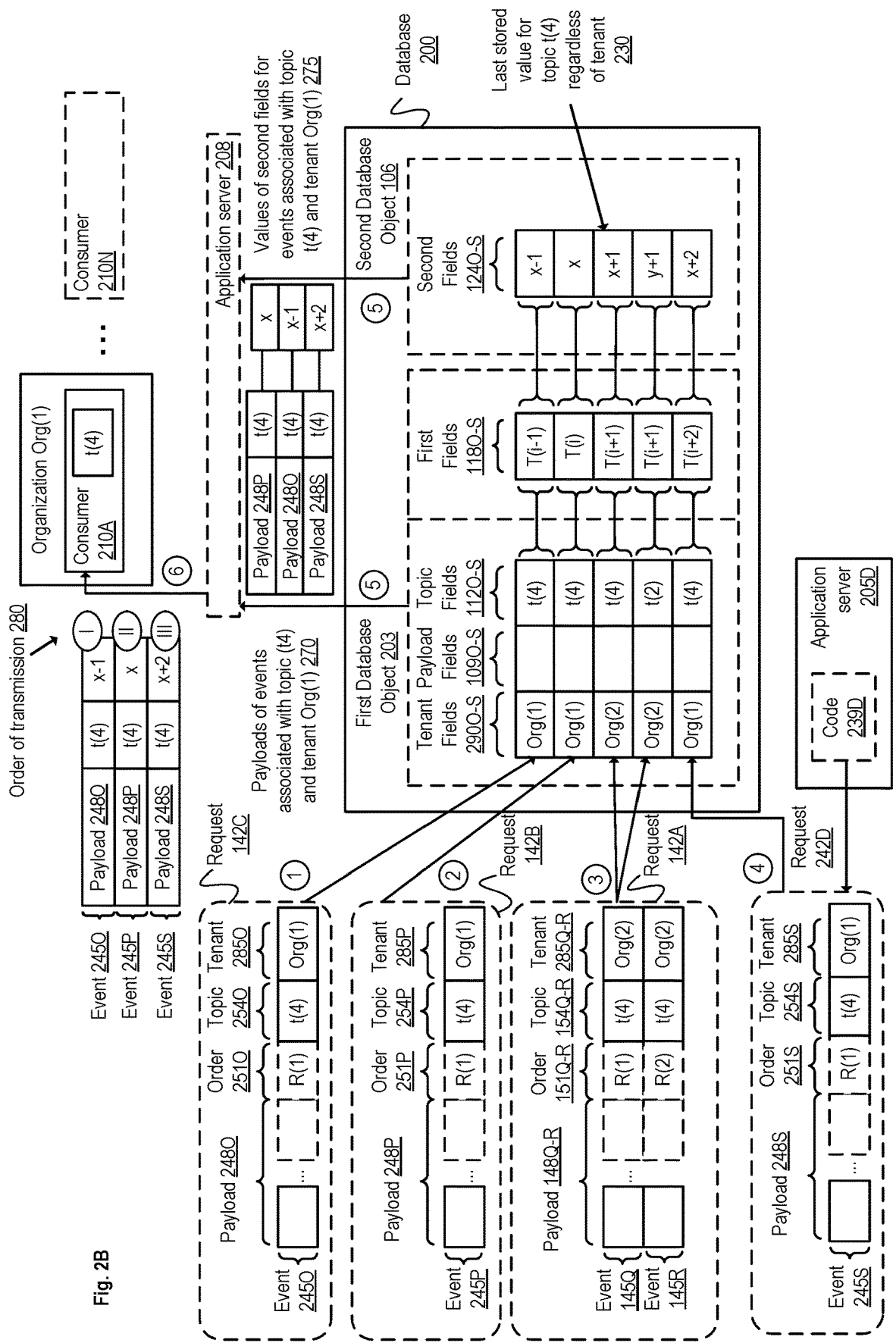
FIG. 2B is a block diagram showing retrieving events associated with a topic and a tenant from a database to be transmitted in order with respect to other events stored in the database which are associated with the topic and the tenant, where the order is based on values per topic in a field of a database object.

FIG. 2B is a block diagram showing retrieving events associated with a topic and a tenant from a database to be transmitted in order with respect to other events stored in the database which are associated with the topic and the tenant, where the order is based on values per topic in a field of a database object.

Specifically, FIG. 2B shows database 200 which includes a first database object 203 and a second database object 106. Second database object 106 and first fields 118A-S were discussed referring to FIG. 1A and FIG. 2A. FIG. 2B also shows first database object 203. Like first database object 103, first database object 203 includes payload fields 109O-S and topic fields 112O-S. However, first database object 203 also includes tenant fields 290O-S.

As shown in FIG. 2A, request 142C is submitted at time 1. However, as shown in FIG. 2B, event 245O includes an attribute for a tenant 285O (i.e., an identifier for a tenant, also referred to as a tenant ID) with value "Org(1)." Responsive to request 142C being submitted, tenant field 290O is updated with the value of tenant 285O (i.e., "Org(1)"). In different implementations, application server 157 (shown in FIG. 1A) or another application server might process request 142C, or database 100 or database 200 might process request 142C (e.g., as discussed referring to FIG. 4). In some implementations, event 245O was published by a publisher of an event associated with a tenant with identifier "Org(1)" (also referred to as a tenant ID). In some implementations, the publisher need not itself include the attribute for a tenant 285O in event 245O. For example, the attribute might be added by an event publishing service in the multi-tenant environment which the publisher calls to publish the event. Additionally or alternatively, the attribute might not be included in event 245O but application server 157 includes a value for the tenant ID in request 142C before it is submitted to database 200.

Requests 142B and 142A are submitted at times 2 and 3 respectively. Event 245P includes an attribute for a tenant 285P with value "Org(1)." Events 145Q and 145R respectively include an attribute for a tenant 285Q and 285R both with values "Org(2)." Responsive to requests 142B and 142A being submitted, tenant fields 290Q and 290R are respectively updated with the value of tenant 285Q and 285R (i.e., "Org(2)"). In some implementations, events 245O was published by a publisher of an event associated with a tenant with ID "Org(2)."

FIG. 2B also shows application server 205D which includes code 239D. Execution of code 139A causes the submission of request 242D at time 4. Request 242D includes event 245S (or data therefor). Event 245S includes payload 248S (which may comprise one or more attributes), identifier for a topic 254S (with value "t(4)"), tenant 285S (with value "Org(1)") and optional order 251P with value "R(1)." Responsive to submission of request 242D: 1) the first database object 203 includes an inserted record which includes a payload field 109S and a topic field 112S with value "t(4)"; 2) database 200 includes a first field 118S updated with value "T(i+2)"; and 3) second database object 106 includes a second field 124S updated with value "x+2." In some implementations, 1) may be due to execution of block 160 (shown in FIG. 1A); 2) may be due to execution of block 170 (id.); and/or 3) may be due to execution of block 180 (id.). In some implementations which support multi-tenant environments, block 160 may further include inserting in the first database object a first record that includes a payload of the event, an identifier for the topic, and an identifier for the tenant in the multi-tenant environment.

In summary, FIG. 2B shows database 200 including records for the following events by tenant and topic and the following second field values:

| Event | Tenant | Topic | Second Field Value |
|-------|--------|-------|-------------------|
| 245O  | Org(1) | t(4)  | x − 1 |
| 245P  | Org(1) | t(4)  | x |
| 145Q  | Org(2) | t(4)  | x + 1 |
| 145R  | Org(2) | t(2)  | y + 1 |
| 245S  | Org(1) | t(4)  | x + 2 |

Notably, these second field values indicate both an order for events to be transmitted 1) by topic (i.e., for topic ID with value "t(4)": event 245O with second field value "x−1," event 245P with second field value "x," event 145Q with second field value "x+1," and event 245S with second field value "x+2"; and for topic ID with value "t(2)": event 145R with value "y+1"), and 2) by topic and by tenant (i.e., for topic ID with value "t(4)" and tenant ID with value "Org (1)": event 245O with second field value "x−1," event 245P with second field value "x," and event 245S with second field value "x+2"; for topic ID with value "t(4)" and tenant ID with value "Org(2)": event 145Q with second field value "x+1"; and for topic ID with value "t(2)" and tenant ID with value "Org(2)": event 145R with value "y+1"). The second field values are thus assigned regardless of tenant in some implementations and updating a second field value is based on a last stored value for a topic regardless of tenant. For example, second field 124S which corresponds to event 245S for tenant ID with value "Org(1)" is updated based on the last stored value for topic t(4) regardless of tenant 230; i.e., second field 124Q which corresponds to event 145Q for tenant ID with value "Org(2)." If last stored values are stored in another database object (discussed later) for fast lookup, updating second field values regardless of tenant means that the last stored values need only be stored by topic and not by topic and tenant. This reduces overhead. Also, updating second field values regardless of tenant facilitates transmitting events for multiple tenants, which may be useful in some scenarios (e.g., for mirroring database 200 to provide redundancy).

At time 5 (indicated with circled reference "5"), payloads of events associated with topic (t4) and tenant Org(1) 270 are retrieved from database 200; i.e., from first database object 203. As shown, payload 248P, payload 248O, and payload 248S are retrieved because they each are associated with topic ID with value "t(4)" (shown in topic fields 112P, 112O, and 112S) and tenant ID with value "Org(1)" (shown in tenant fields 290P, 290O, and 290S). Also, values of second fields for events associated with topic t(4) and tenant Org(1) 275 are retrieved from database 200; i.e., from second database object 106. As shown, value "x" is retrieved from second field 124P, value "x−1" is retrieved from second field 124O, and value "x+2" is retrieved from second field 124S.

At time 6 (indicated with circled reference "6"), application server 208 transmits events 245O, 245P, and 245S to consumer 210A that has subscribed to the topic with identifier "t(4)" (as indicated by the box containing the text "t(4)" included in the box for consumer 210A) and that is associated with organization (i.e., a tenant) with identifier "Org(1)." As shown, event 245O has been reconstituted with payload 248O and topic ID with value "t(4)" both from first database object 203; event 245P has been reconstituted with payload 249P and topic ID with value "t(4)" both from first database object 203; and event 245S has been reconstituted with payload 248S and topic ID with value "t(4)" both from first database object 203. Events 245O, 245P, and 245S are transmitted to consumer 210A in order of transmission 280 indicated with roman numerals I, II, and III, which correspond to the values "x−1," "x," and "x+2" which were the values retrieved respectively from second fields 124O, 124P, and 124S in second database object 106. In some implementations, the values "x−1," "x," and "x+2" are included with events 245O, 245P, and 245S. In other implementations, these values are not included with the events (whose ordering may be expressed in the order in which the events are transmitted).

Thus, implementations are described herein that store an event (e.g., event 245S) associated with a topic (e.g., topic ID with value "t(4)") and a tenant (e.g., tenant ID with value "Org(1)") in a database (e.g., database 200) to allow for the event to be transmitted in order with respect to other events associated with the topic and the tenant (events 245O and 245P) which are stored in the database, and the event (or its payload) and the other events (or their payloads) are retrievable to be transmitted in an order based on the value of the second field of the second record (e.g., the value of second field of second record 124S) and the values of the second fields of the second plurality of records (e.g., the values of second fields 124O and 124P). Additionally, implementations described herein allow for the update of values of the second fields regardless of tenant.

Ordering Based on Topic and Tenant

Figure 2C:
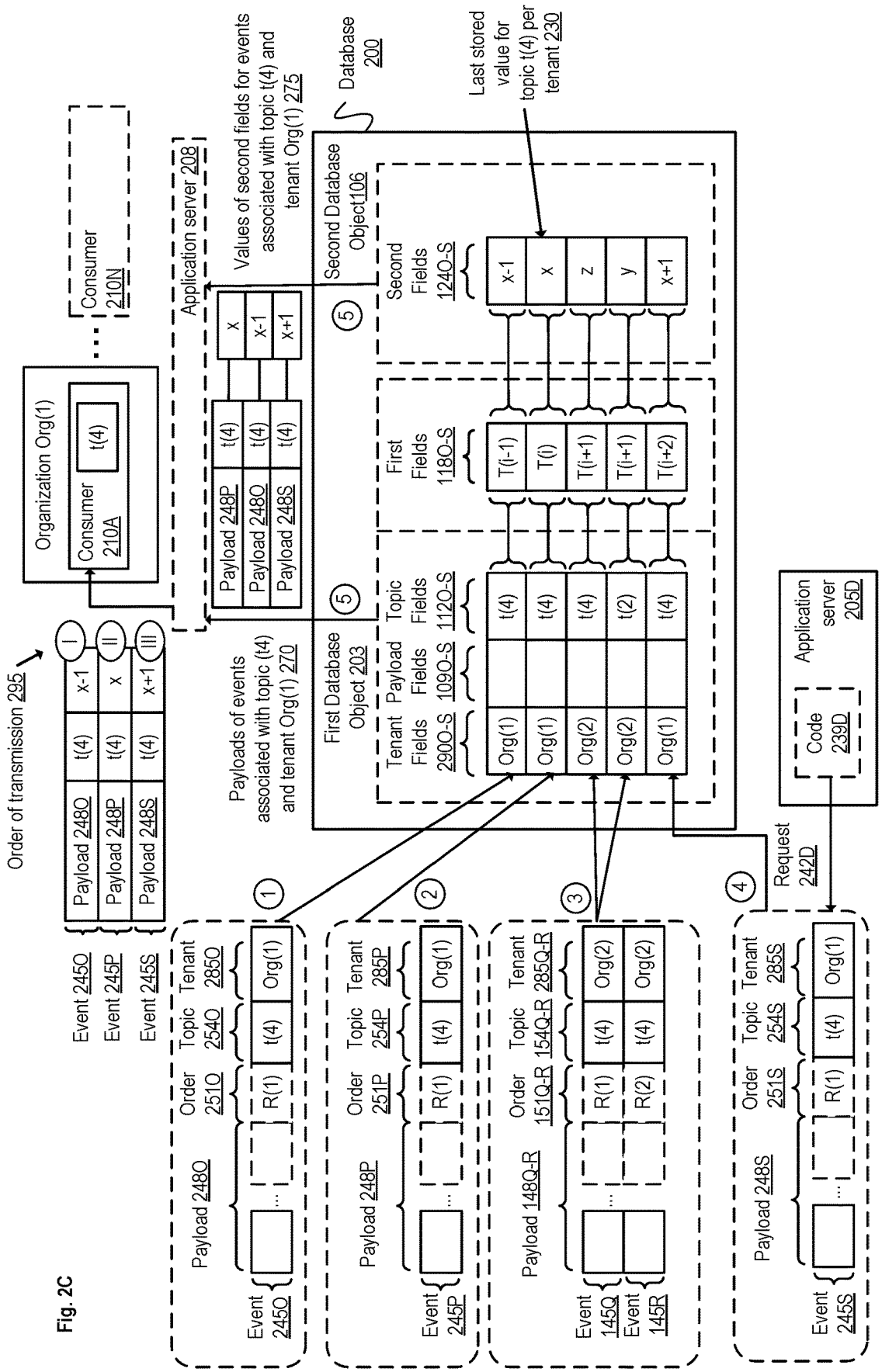
FIG. 2C is a block diagram showing retrieving events associated with a topic and a tenant from a database to be transmitted in order with respect to other events stored in the database which are associated with the topic and the tenant, where the order is based on values per topic and per tenant in a field of a database object, according to some example implementations.

FIG. 2C is a block diagram showing retrieving events associated with a topic and a tenant from a database to be transmitted in order with respect to other events stored in the database which are associated with the topic and the tenant, where the order is based on values per topic and per tenant in a field of a database object, according to some example implementations. Basing the order per topic and per tenant effectively increases the number of events for which a value be stored in a second field for a given data type for that field. For example, if a data type of the second field can store a value between −2,147,483,647 and 2,147,483,647, if the second field value is per topic (and not per tenant), a value of two times 2,147,483,647 plus one (for value "0") can be stored regardless of tenant. If, however, the second field value is per topic and per tenant, and say two tenants have equal numbers of events per topic, then a value of two times 2,147,483,647 plus one (for value "0") can be stored per tenant for an effective total of four times 2,147,483,647 plus two. Storing second field values per tenant and per topic can provide better scalability than storing second field values per topic (and not per tenant).

The elements shown in FIG. 2C have been described referring to FIG. 2B with the notable difference that second fields 124O-S store different values in FIG. 2C compared to FIG. 2B:

| Event | Tenant | Topic | Values of Second Fields 124O-S in FIG. 2B | Values of Second Fields 124O-S in FIG. 2C |
|---|---|---|---|---|
| 245O | Org(1) | t(4) | x − 1 | x − 1 |
| 245P | Org(1) | t(4) | x | x |
| 145Q | Org(2) | t(4) | x + 1 | z |
| 145R | Org(2) | t(2) | y | y |
| 245S | Org(1) | t(4) | x + 2 | x + 1 |

As the above table indicates, the values of second fields 124O and 124P are the same in FIG. 2B as in FIG. 2C. However, in FIG. 2B, the value of second field 124Q (i.e., "x+1") is different from the value of second field 124Q in FIG. 2C (i.e., "z"). FIG. 2C shows an implementation where second field values are updated based on topic ID and tenant. Thus, in the implementation shown in FIG. 2C, the value of second field 124Q is not updated based on the value of second field 124P (like in FIG. 2B) but based on the value of another second field (e.g., a value "z−1" (not shown)) corresponding to another event associated with the topic ID with value "t(4)" and the tenant ID with value "Org(2)" (not shown) or on an initial value. Thus, in FIG. 2C, the value of second field 124S is updated based on the value of a last stored value corresponding to the value of second field 124P (i.e., "x") for the topic ID and tenant; i.e., with value "x+1" rather than with value "x+2" as shown in FIG. 2B.

In contrast with FIG. 2B, at time 5, values of second fields for events associated with topic t(4) and tenant Org(1) 275 are retrieved from database 200; i.e., from second database object 106. As shown, value "x" is retrieved from second field 124P, value "x−1" is retrieved from second field 124O, and value "x+1" (rather than value "x+2" shown in FIG. 2B) is retrieved from second field 124S.

At time 6, application server 208 transmits events 245O, 245P, and 245S to consumer 210A that has subscribed to the topic with identifier "t(4)" (as indicated by the box containing the text "t(4)" included in the box for consumer 210A) and that is associated with organization (i.e., a tenant) with identifier "Org(1)." Events 245O, 245P, and 145Q are transmitted to consumer 210A in order of transmission 295 indicated with roman numerals I, II, and III, which correspond to the values "x−1," "x," and "x+1" which were the values retrieved respectively from second fields 124O, 124P, and 124S in second database object 106. Notably, the order that events 245O, 245P, and 245S are transmitted to consumer 210A (i.e., order of transmission 295) does not differ from the order that the events are transmitted to consumer 210A as shown in FIG. 2B (i.e., order of transmission 280), however the second field values associated with the events differ because in FIG. 2C the values are per tenant and per topic whereas in FIG. 2B the values are per topic (and not per tenant).

Thus, implementations are described herein that store an event (e.g., event 245S) associated with a topic (e.g., topic ID with value "t(4)") and a tenant (e.g., tenant ID with value "Org(1)") in a database (e.g., database 200) to allow for the event to be transmitted in order with respect to other events associated with the topic and the tenant (events 245O and 245P) which are stored in the database, and the event (or its payload) and the other events (or their payloads) are retrievable to be transmitted in an order based on the value of the second field of the second record (e.g., the value of second field of second record 124S) and the values of the second fields of the second plurality of records (e.g., the values of second fields 124O and 124P). Additionally, implementations described herein allow for updating values of the second fields per tenant and per topic.

Example Database Schemas

FIGS. 1A and 2A-2C, showed exemplary schemas for database 100 and 200 that included a first database object 103 or 203, and a second database object 106. Also, exemplary schemas were discussed where first fields 118O-S were included in 1) first database object 103, 2) second database object 106, or 3) a different database object. Other exemplary schemas are possible, including where one or more last stored values are stored in a fourth database object (that is different from the first, second, and optionally a third database object).

Figure 3A:
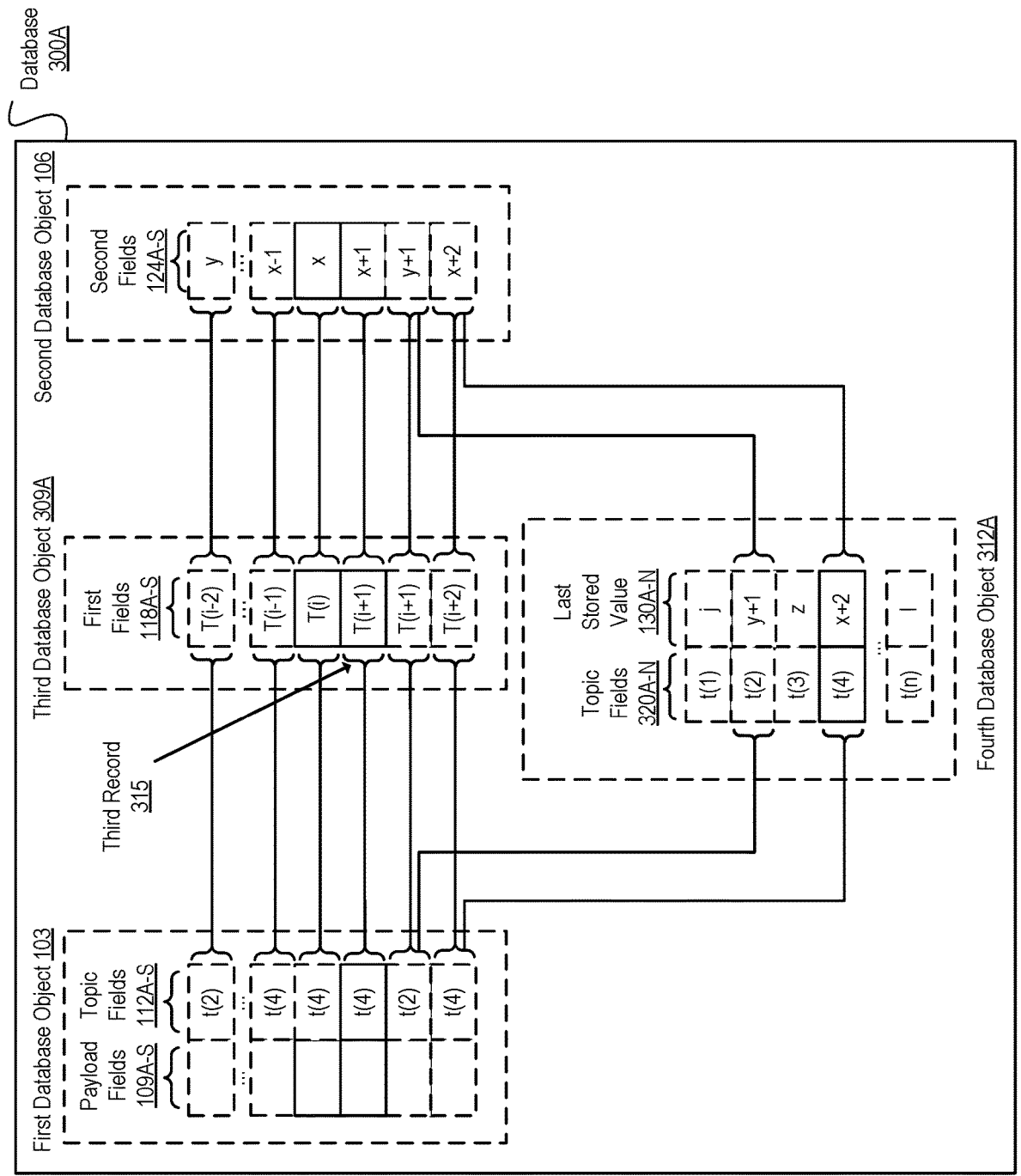
FIG. 3A is a block diagram showing an exemplary database schema for storing an event associated with a topic in a database to allow for the event to be transmitted in order with respect to other events associated with the topic which are stored in the database, according to some example implementations.

FIG. 3A is a block diagram showing such an exemplary database schema. FIG. 3A shows database 300A. Database 300A includes: 1) first database object 103, 2) second database object 106, 3) third database object 309A, and 4) fourth database object 312A. First database object 103 and second database object 106 were discussed previously (e.g., in relation to FIG. 1A).

Using Default Values in a Third Database Object

Third database object 309A includes first fields 118A-S which were also discussed previously (e.g., in relation to FIG. 1A). As discussed, in some implementations, the updating a first field for the first record 115Q (performed in block 170 shown in FIGS. 1A and 1B) might include inserting in the third database object 309A a third record 315 which includes the first field 118Q (and, optionally, a third field (not shown)) for the first record 115Q. However, the inserting the third record 315 may occur separately from updating the first field of the third record (e.g., which may be performed in block 170). Thus, in some implementations, inserting a record with a first field—whether that record is inserted in a first database object 103, a second database object 106, or a third database object 309A—may include inserting the first field with a default value, per block 363 shown in FIG. 3C. In one implementation, a default value can be inserted automatically in the first field if 1) the database object is configured to insert a default value in the field if one is not provided (e.g., in an RDBMS, by specifying "NULL" for the column comprising the first fields or by specifying "DEFAULT ON NULL" and a default value for that column), and 2) no value is provided for the first field. In another implementation, a default value can be inserted in the first field by specifying that default value when the record which includes the first field is inserted. In yet another implementation, in block 367, the first field is updated with a default value. Inserting or updating the first field with a default value helps identify which first fields need to be updated with an identifier of the commit of the transaction in block 170.

Storing Last Stored Values in a Fourth Database Object

Fourth database object 312A includes topic fields 320A-N and fields for a last stored value 130A-N. The fourth database object 312A provides a way of retrieving a last stored value for faster lookup. Different implementations support different ways of retrieving a last stored value based on which a value for a second field is updated. With reference to FIG. 3C, some implementations include block 373, to which flow passes from block 170 (previously discussed). Block 373 includes retrieving from the database a last stored value among values stored in second fields of a second plurality of records that are associated with the other events. Implementations may include block 376, in which the value of the second field of one of the second plurality of records that is a last in an order based on the values of the second fields of the second plurality of records is identified as the last stored value. For example, if second field values are in ascending or descending order, identifying a value of the second field that is last in an order can be performed by finding the greatest or least value of the second field values. In a sense, identifying the last stored value can be performed on-demand in such implementations.

Other implementations may include optional block 378 in block 376. In block 378, the last stored value is included in a field associated with the identifier for the topic in a second database object (e.g., fourth database object 312A in FIG. 3A). In these implementations, identifying a last stored value include retrieving the last stored value associated with a topic ID from the second database object. For example, consider the exemplary database schema shown in FIG. 3A. The fourth database object 312A shows topic field 320D (with value "t(4)") and corresponding last stored value 130D (with value "x+2"). Last stored value 130D corresponds to the value of second field 124S which corresponds to record 215S. If, for an event, a record associated with topic ID with value "t(4)" is inserted in first database object 103 (e.g., through execution of block 160), the value of a second field of a record associated with the event can be updated based on the last stored value 130D (e.g., through execution of block 378). Implementations which include block 378 may also include block 383, in which the field associated with the identifier for the topic in the second database object is updated with the value stored in the value of the second field of the second record (e.g., for future use in block 378). Thus, block 378 (and block 383) allow for faster lookup of a last stored value because the last stored value is stored associated with a topic ID and need not be determined "on-demand" by finding a last value in an order amongst values of second fields.

Exemplary Schema in Single and Multi-Tenant Environments

FIG. 3B is another block diagram showing another exemplary database schema for storing an event associated with a topic in a database to allow for the event to be transmitted in order with respect to other events associated with the topic which are stored in the database, according to some example implementations.

The exemplary database schema shown in FIG. 3B for database 300B includes first database object 303, a second database object 306, a third database object 309B, and in different implementations, either fourth database object 312A or fourth database object 312B.

Compared to the first database object 103 shown in FIG. 3A, first database object 303 also includes tenant IDs 290A-S and payload IDs 325A-S. Tenant IDs 290A-S are fields for storing values of tenant IDs (e.g., "Org(1)," "Org(2)," etc.). Payload IDs 325A-S are fields for storing identifiers for payloads. For example, payload field(s) 109A are identified with the identifier with value "A" in payload ID 325A. Payload IDs 325A-S can be used as a key to look up different records and/or fields associated with an event's payload. For example, when retrieving data for events associated with tenant ID with value "Org(1)" and topic ID with value "t(4)," a client of the database can query the first database object 303 for records with that tenant ID and topic ID to be transmitted based on values of second fields corresponding to those records by joining the records of first database object 303 with corresponding records of second database object 306 using the payload IDs common to both the first and second database objects. In a database which supports SQL, this can be performed using an SQL statement such as "SELECT first_database_object.topic_id, first_ database_object.payload, second_database_object.second_field FROM first_database_object INNER JOIN first_database_object ON first_database_object.payload_id=second_database_object.payload_id WHERE first_database_object.topic_id='t(4)' AND first_database_object.tenant_id='Org(1)';" if 1) first database object 303 is referenced as "first_database_object"; 2) second database object 306 is referenced as "second_database_object"; 3) topic fields 112A-S are referenced as "topic_id" in first database object 303; 4) payload fields 109A-S are referenced as "payload" in first database object 303; 5) second fields 124A-S are referenced as "second_field" in second database object 306; 6) tenant IDs 290A-S are referenced as "tenant_id" in first database object 303; and 7) payload IDs 325A-S are referenced as "payload_id" in each of first database object 303 and second database object 306.

Compared to the second database object 106 shown in FIG. 3A, second database object 306 also includes tenant IDs 290A-S, payload IDs 325A-S, and topic fields 112A-S (also included in the first database object 103 and 303). Also, second database object 306 includes times 335A-S. Times 335A-S are fields that store a time associated with the records in second database object 306. For example, times 335A-S may store values that indicate respective times at which events were created or published (which may be stored in payloads and/or headers of events).

Compared to the third database object 309A, third database object 309B also includes tenant IDs 290A-S, payload IDs 325A-S, and third fields 121A-S (shown in FIG. 1A). Also, third database object 309B includes times 340A-S. Times 340A-S are fields that store a time associated with the records in third database object 309B. For example, times 340A-S may store values that indicate times at which events were stored in the database. Such a value may be stored for an event when 1) the event's payload and topic ID are stored in the first database object 303 (e.g., when block 160 is performed); or 2) the second field associated with the event is updated (e.g., when block 180 is performed).

Compared to the fourth database object 312A, fourth database object 312B includes tenant IDs 290A-T and payload IDs 325A-T. Fourth database object 312B also includes fields for a last stored value 330A-T. Fourth database object 312B represents an exemplary database object for storing last values by topic and tenant. Hence, in some implementations, fourth database object 312B may include a different number of records than would be stored in a fourth database object (e.g., fourth database object 312A) which stores last values by topic and not by tenant.

The exemplary database schema shown in FIG. 3B may be adapted for use in single-tenant environments by omitting tenant IDs 290A-S in the first, second, third, and fourth database objects.

Implementations in a Database

Implementations are described herein which involve an application server (e.g., application server 157 shown in FIG. 1A) performing operations for storing an event associated with a topic in a database to allow for the event to be transmitted in order with respect to other events associated with the topic which are stored in the database. Alternatively, however, implementations may implement one or more of these operations in a database rather than in an application server. For example, one or more operations may be implemented using procedures or code embedded in a database. Implementing one or more operations in a database can provide for a self-contained database application that performs allow for the event to be transmitted in order with respect to other events associated with the topic which are stored in the database. Such an application provides a pre-packaged solution that reduces implementation costs and provides technical benefits such as improved performance (e.g., because operations can be performed with fewer requests on the database, reducing networking traffic, and/or operations can be pipelined to reduce context switching and data transfer, such as updating first fields automatically when a transaction is committed).

FIG. 4 is a flow diagram showing methods for a database to store an event associated with a topic to allow for the event to be transmitted in order with respect to other events associated with the topic which are stored in the database, according to some example implementations.

In block 400, responsive to a first request, a commit of a transaction is performed that includes inserting in a first database object a first record that includes a payload of the event and an identifier for the topic. The first database object includes a first plurality of records. In some implementations, block 400 optionally includes block 410. In block 410, the transaction further includes inserting in the first database object a third record that includes the identifier for the topic and a payload of another event associated with the topic. From block 400 or block 410, flow passes to block 420.

In block 420, a second request is optionally retrieved. The second request is to update a first field for the first record with an identifier of the commit of the transaction. From block 420, flow passes to block 430.

In block 430, after committing the transaction, the first field for the first record is updated with the identifier of the commit of the transaction. The identifier and identifiers of other commits of other transactions indicate ordering of the committing of the transaction with respect to other commits of the other transactions. From block 430, flow passes to optional block 440.

In block 440, a third request is received to update a second field of a second record associated with the event. From block 440, flow passes to block 450.

Block 450 includes updating, based on the identifier and the last stored value among values stored in second fields of a second plurality of records that are associated with the other events, the value of the second field of the second record such that the payload of the event and the payloads of the other events are retrievable from the first record and the first plurality of records to be transmitted in an order based on the value of the second field of the second record and the values of the second fields of the second plurality of records to one or more consumers that have subscribed to the topic.

Although FIG. 4 shows some implementations where one or more operations are implemented using procedures or code embedded in a database, other features of other implementations described herein with respect to FIGS. 1A-3C can be similarly implemented. For example, use of different exemplary database schemas can be implemented with corresponding operations performed by the database rather than an application server. Single tenant and multi-tenant implementations can also apply. Thus, FIG. 4 is exemplary and not limiting.

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
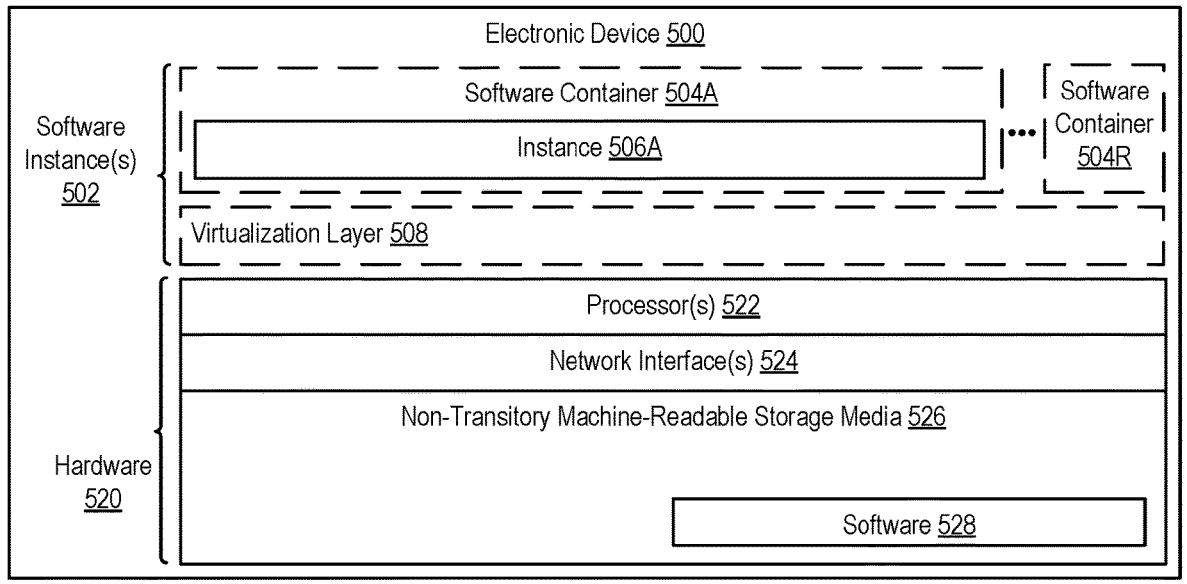
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). One or more implementations described herein may be implemented as a service (e.g., an event storage service). Each of the previously described database and/or one or more application servers may be implemented in one or more electronic devices 500. In one implementation, the database (e.g., database 100) can be part of an event storage platform that offers an event storage service. In some implementations, the event storage platform may include the database 100 and the application server 157. In other implementations, one of the database 100 and the application server 157 are implemented as services separate to the event storage platform. In one implementation, the event storage service can be available to one or more clients (such as consumers, and/or components which store events (e.g., publishers which submit requests to application server 157 and/or a database (e.g., database 100))). In one implementation: 1) each of the clients is implemented in a separate one of the electronic devices 500 (e.g., in end user devices where the software 528 represents the software to implement clients to interface directly and/or indirectly with the event storage service (e.g., software 528 represents a web browser, a native client, a portal, a command-line interface, and/or an application programming interface (API) based upon protocols such as Simple Object Access Protocol (SOAP), REpresentational State Transfer (REST), etc.)); 2) the event storage service is implemented in a separate set of one or more of the electronic devices 500 (e.g., a set of one or more server devices where the software 528 represents the software to implement the event storage service); and 3) in operation, the electronic devices implementing the clients and the event storage service would be communicatively coupled (e.g., by a network) and would establish between them (or through one or more other layers and/or or other services) connections for submitting requests and/or API calls to the event storage service and returning events or their payloads to the clients (if consumers). Other configurations of electronic devices may be used in other implementations (e.g., an implementation in which the client and the event storage service are implemented on a single electronic device 500).

During operation an instance of the software 528 (illustrated as instance 506A and also referred to as a software instance; and in the more specific case of an application, as an application instance) is executed. In electronic devices that use compute virtualization, the set of one or more processor(s) 522 typically execute software to instantiate a virtualization layer 508 and software container(s) 504A-R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 528 is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
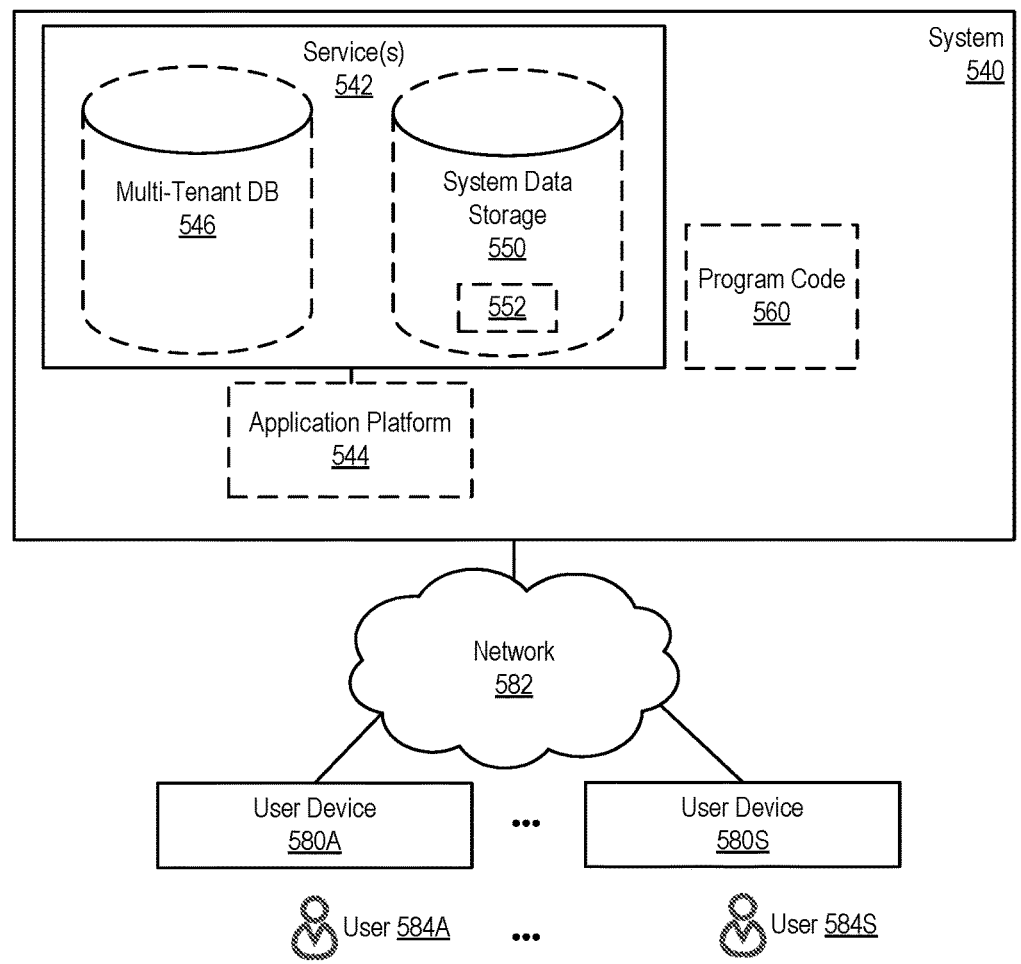
FIG. 5B is a block diagram of a deployment environment according to some example implementations.

FIG. 5B is a block diagram of a deployment environment according to some example implementations. A system 540 includes hardware (e.g, a set of one or more server devices) and software to provide service(s) 542, including the event storage service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third party datacenter(s), which are datacenter(s) owned and/or operated by one or more different entities than the entity that provides the service(s) 542 (e.g., the different entities may host some or all of the software provided and/or operated by the entity that provides the service(s) 542). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-S over a network 582. The service(s) 542 may be on-demand services that are made available to one or more of the users 584A-S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-S). The service(s) 542 may communicate with each other and/or with one or more of the user devices 580A-S via one or more APIs (e.g., a REST API). The user devices 580A-S are operated by users 584A-S.

In some implementations the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following:

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning, event storage service |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more SQL statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the event storage service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as HyperText Transfer Protocol (HTTP), Andrew File System (AFS), Wireless Application Protocol (WAP), File Transfer Protocol (FTP), Network File System (NFS), an application program interface (API) based upon protocols such as SOAP, REST, etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," "some implementations," "other implementations," etc., indicate that the implementation(s) described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for storing an event associated with a topic in a database to allow for the event to be transmitted in order with respect to other events associated with the topic which are stored in the database, the method comprising:

causing a database to perform a commit of a transaction that includes inserting in a first database object that includes a first plurality of records a first record that includes a payload of the event and an identifier for the topic, wherein the commit completes the inserting the first record in the first database object and each of the first plurality of records includes a respective one of payloads of the other events and the identifier for the topic;

after the transaction is committed, updating a first field for the first record with an identifier of the commit of the transaction, wherein the identifier of the commit of the transaction and identifiers of other commits of other transactions on the database indicate ordering of the commit of the transaction with respect to the other commits of the other transactions; and updating, based on the identifier of the commit of the transaction and a last stored value among values stored in second fields of a second plurality of records that are associated with the other events, a value of a second field of a second record associated with the event such that the payload of the event and the payloads of the other events are retrievable from the first record and the first plurality of records to be transmitted in an order based on the value of the second field of the second record and the values of the second fields of the second plurality of records to one or more consumers that have subscribed to the topic, wherein the second record and the second plurality of records are included in a second database object together with records that are associated with events associated with another topic.

2. The method of claim 1, wherein the transaction further includes inserting in the first database object a third record that includes the identifier for the topic and a payload of another event associated with the topic, the method further comprising:

updating a third field for the first record and a third field for the third record respectively with a value of the third field for the first record and a value of the third field for the third record that indicate ordering in the transaction of the payload of the event and the payload of the another event, wherein the updating the value of the second field of the second record is further based on the value of the third field for the first record.

3. The method of claim 1, wherein the second database object is different from the first database object.

4. The method of claim 1, wherein the first field for the first record is included in a third record in a third database object that is different from the first database object.

5. The method of claim 1, wherein the first record includes the first field for the first record.

6. The method of claim 1, wherein the last stored value is included in a field associated with the identifier for the topic in a fourth database object.

7. The method of claim 6, the method further comprising retrieving the last stored value from the field associated with the identifier for the topic.

8. The method of claim 1, the method further comprising retrieving the last stored value from the database, wherein the retrieving the last stored value includes identifying as the last stored value the value of the second field of one of the second plurality of records that is a last in another order based on the values of the second fields of the second plurality of records.

9. The method of claim 1, wherein the other events were published by a plurality of application servers, and wherein the values stored in the second fields of the second plurality of records correspond to a chronological order of publication of those events by the application servers.

10. The method of claim 1, wherein the transaction further includes inserting the first field for the first record with a default value before the updating the first field for the first record is performed.

11. A non-transitory machine-readable storage medium that provides instructions that, when executed by a processor, are capable of causing the processor to perform operations for storing an event associated with a topic in a database to allow for the event to be transmitted in order with respect to other events associated with the topic which are stored in the database, the operations comprising:
  causing a database to perform a commit of a transaction that includes inserting in a first database object that includes a first plurality of records a first record that includes a payload of the event and an identifier for the topic, wherein each of the first plurality of records includes a respective one of payloads of the other events and the identifier for the topic;
  after the transaction is committed, updating a first field for the first record with an identifier of the commit of the transaction, wherein the identifier of the commit of the transaction and identifiers of other commits of other transactions on the database indicate ordering of the commit of the transaction with respect to the other commits of the other transactions; and
  updating, based on the identifier of the commit of the transaction and a last stored value among values stored in second fields of a second plurality of records that are associated with the other events, a value of a second field of a second record associated with the event such that the payload of the event and the payloads of the other events are retrievable from the first record and the first plurality of records to be transmitted in an order based on the value of the second field of the second record and the values of the second fields of the second plurality of records to one or more consumers that have subscribed to the topic, wherein the second record and the second plurality of records are included in a second database object together with records that are associated with events associated with another topic.

12. The non-transitory machine-readable storage medium of claim 11, wherein the transaction further includes inserting in the first database object a third record that includes the identifier for the topic and a payload of another event associated with the topic, and wherein the storage medium further provides instructions that, when executed by the processor, are capable of causing the processor to perform further operations comprising:
  updating a third field for the first record and a third field for the third record respectively with a value of the third field for the first record and a value of the third field for the third record that indicate ordering in the transaction of the payload of the event and the payload of the another event, wherein the updating the value of the second field of the second record is further based on the value of the third field for the first record.

13. The non-transitory machine-readable storage medium of claim 11, wherein the second database object is different from the first database object.

14. The non-transitory machine-readable storage medium of claim 11, wherein the first field for the first record is included in a third record in a third database object that is different from the first database object.

15. The non-transitory machine-readable storage medium of claim 11, wherein the first record includes the first field for the first record.

16. The non-transitory machine-readable storage medium of claim 11, wherein the last stored value is included in a field associated with the identifier for the topic in a fourth database object.

17. The non-transitory machine-readable storage medium of claim 16 that further provides instructions that, when executed by the processor, are capable of causing said processor to perform further operations comprising retrieving the last stored value from the field associated with the identifier for the topic.

18. The non-transitory machine-readable storage medium of claim 11 that further provides instructions that, when executed by the processor, are capable of causing said processor to perform further operations comprising retrieving the last stored value from the database, wherein the retrieving the last stored value includes identifying as the last stored value the value of the second field of one of the second plurality of records that is a last in another order based on the values of the second fields of the second plurality of records.

19. The non-transitory machine-readable storage medium of claim 11, wherein the other events were published by a plurality of application servers, and wherein the values stored in the second fields of the second plurality of records correspond to a chronological order of publication of those events by the application servers.

20. The non-transitory machine-readable storage medium of claim 11, wherein the transaction further includes inserting the first field for the first record with a default value before the updating the first field for the first record is performed.

* * * * *